Aug. 27, 1968        F. ZIOLKO        3,399,066
METHOD FOR MANUFACTURING CASING FROM A CONTINUOUS TUBE
Original Filed May 29, 1963        15 Sheets-Sheet 1
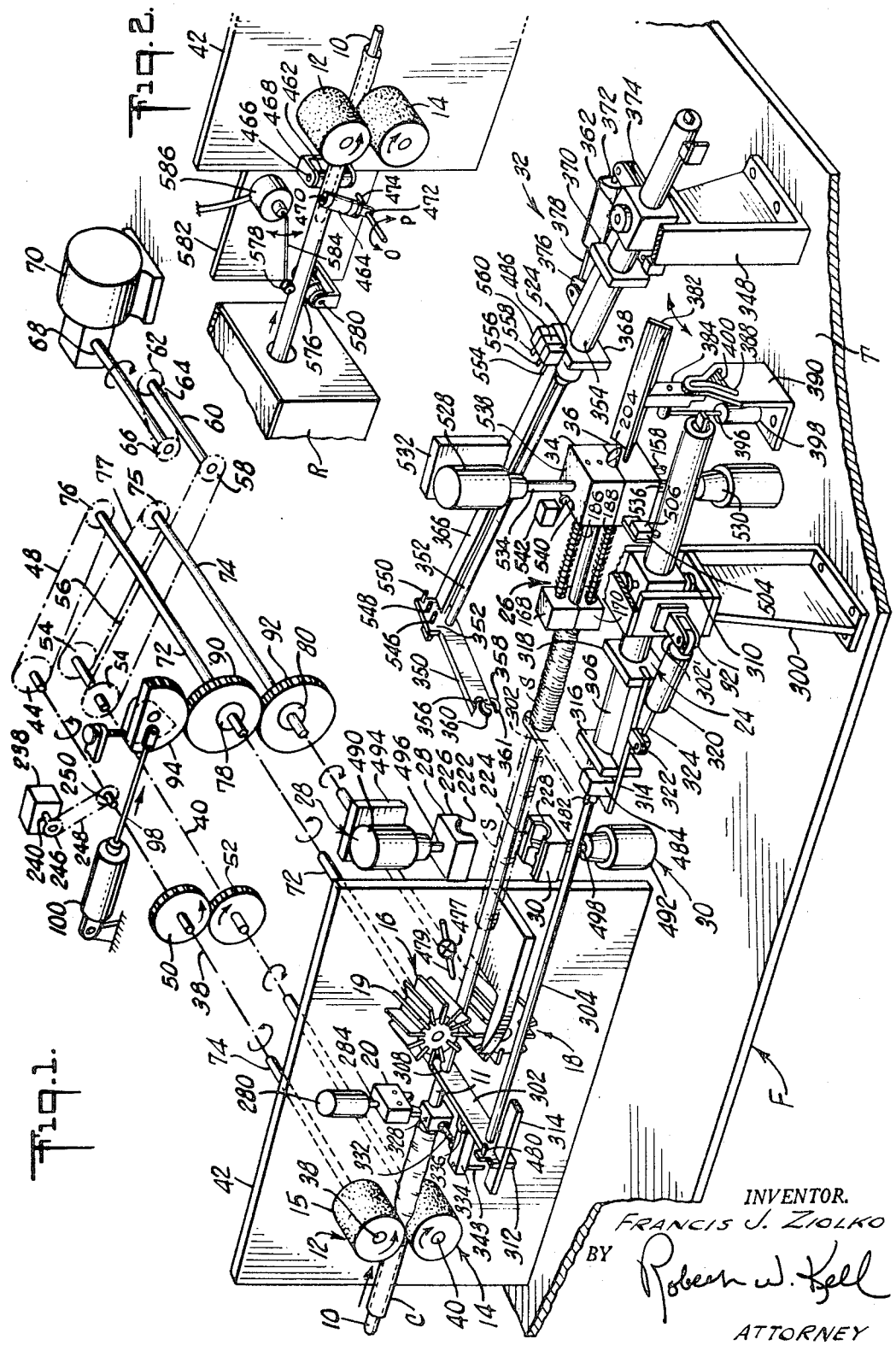
INVENTOR.
FRANCIS J. ZIOLKO
BY Robert W. Kell
ATTORNEY

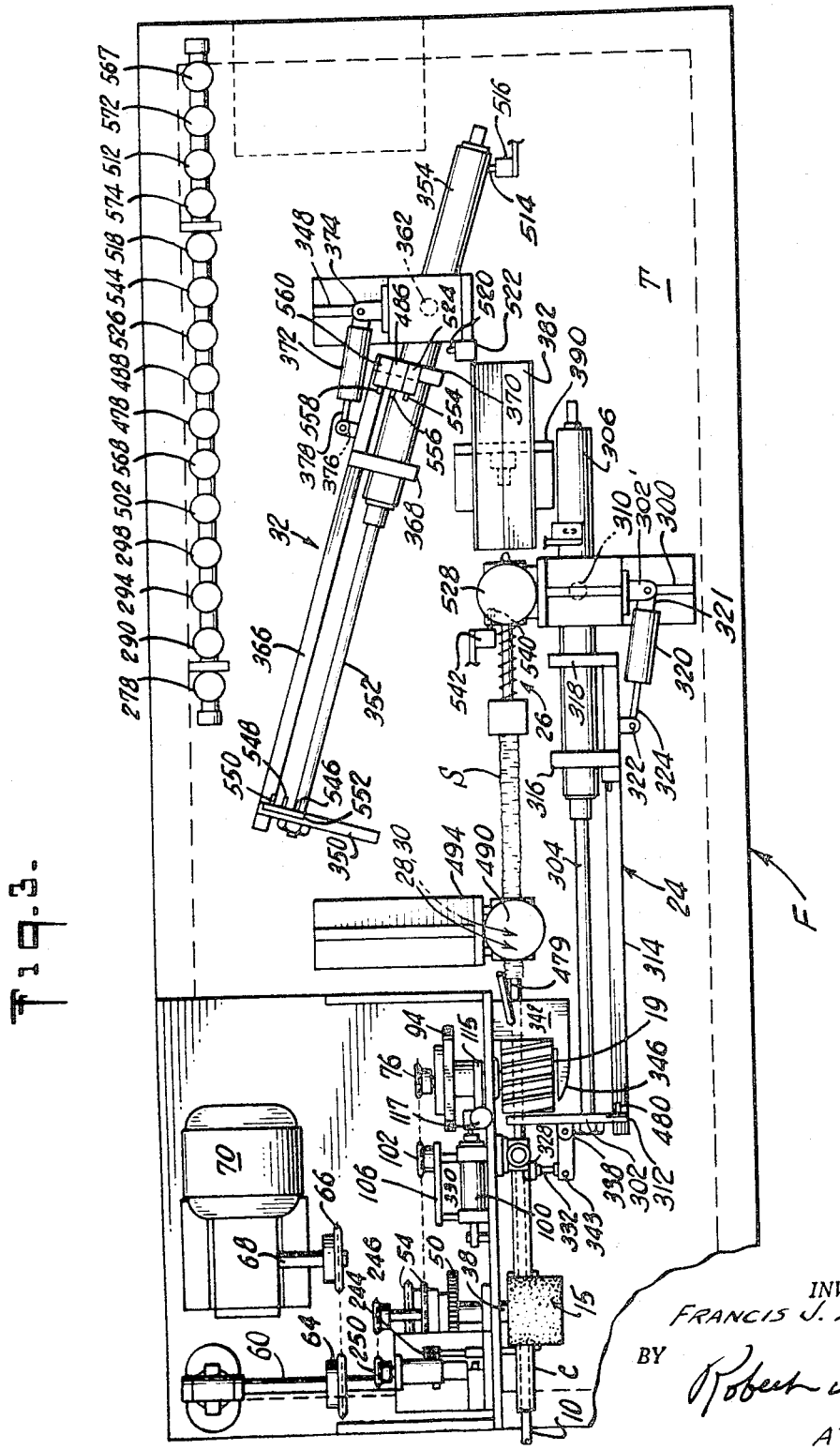

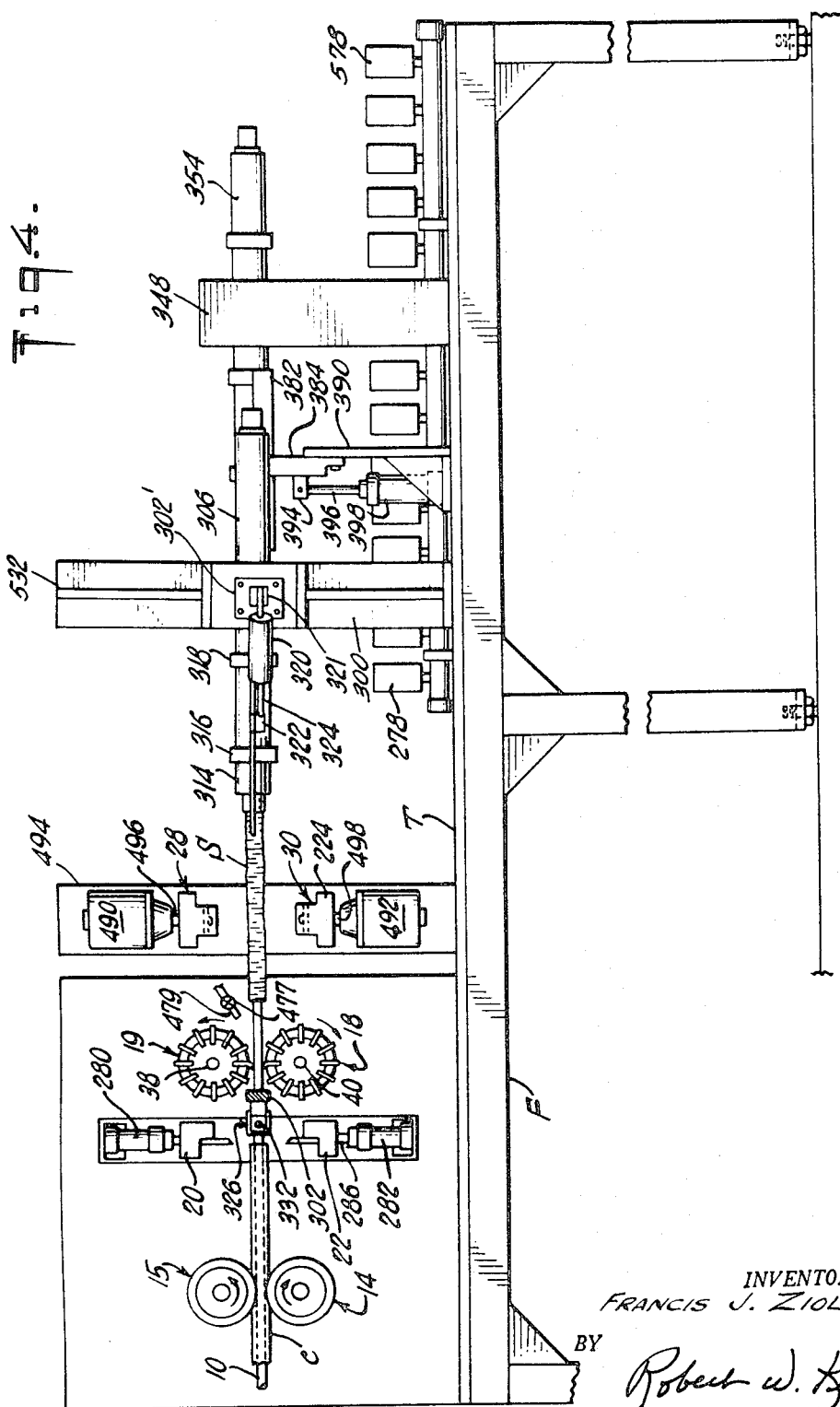

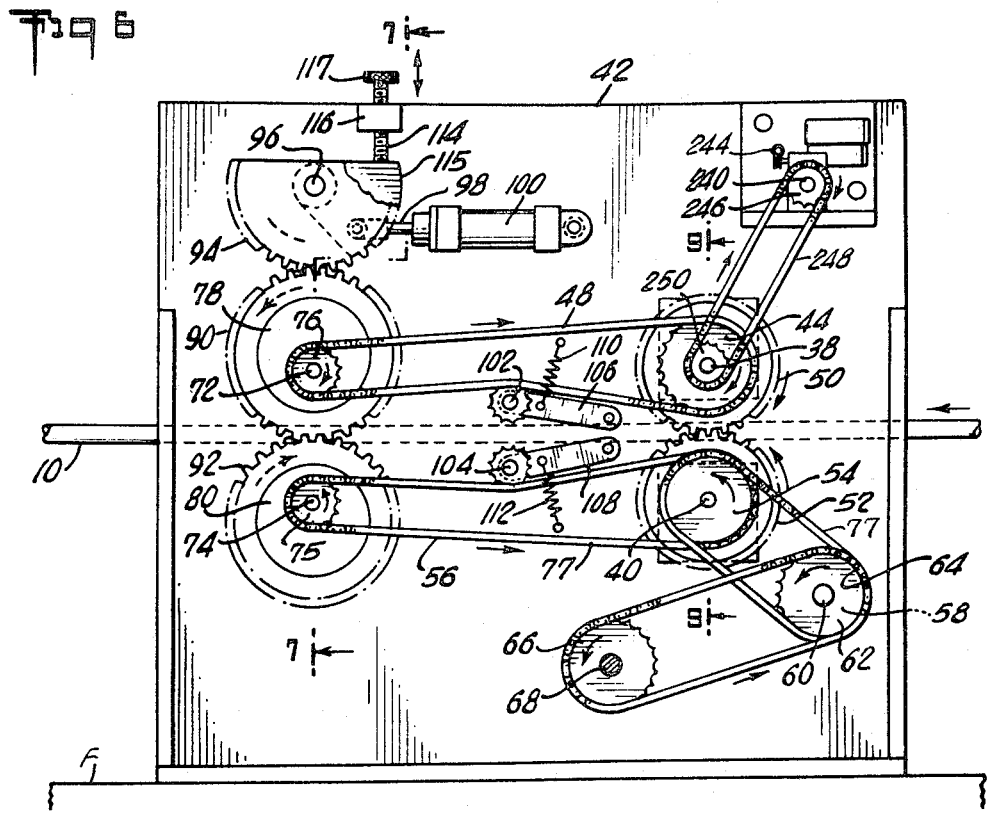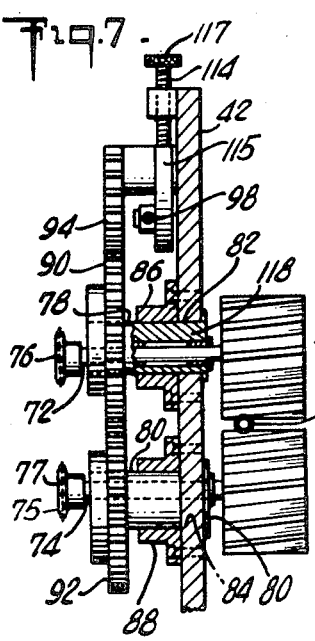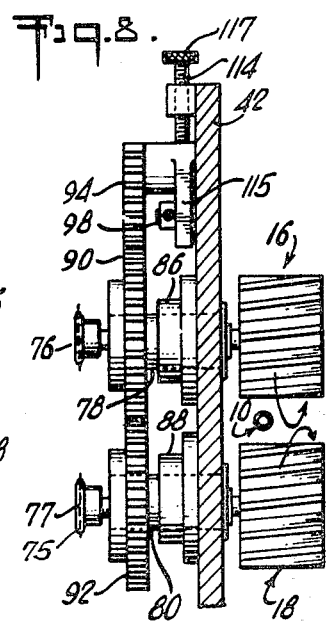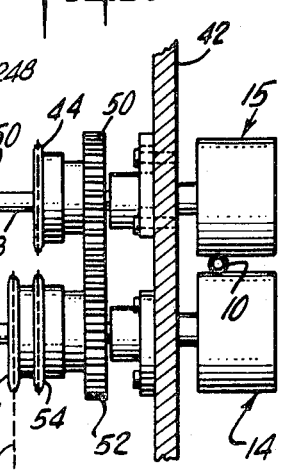

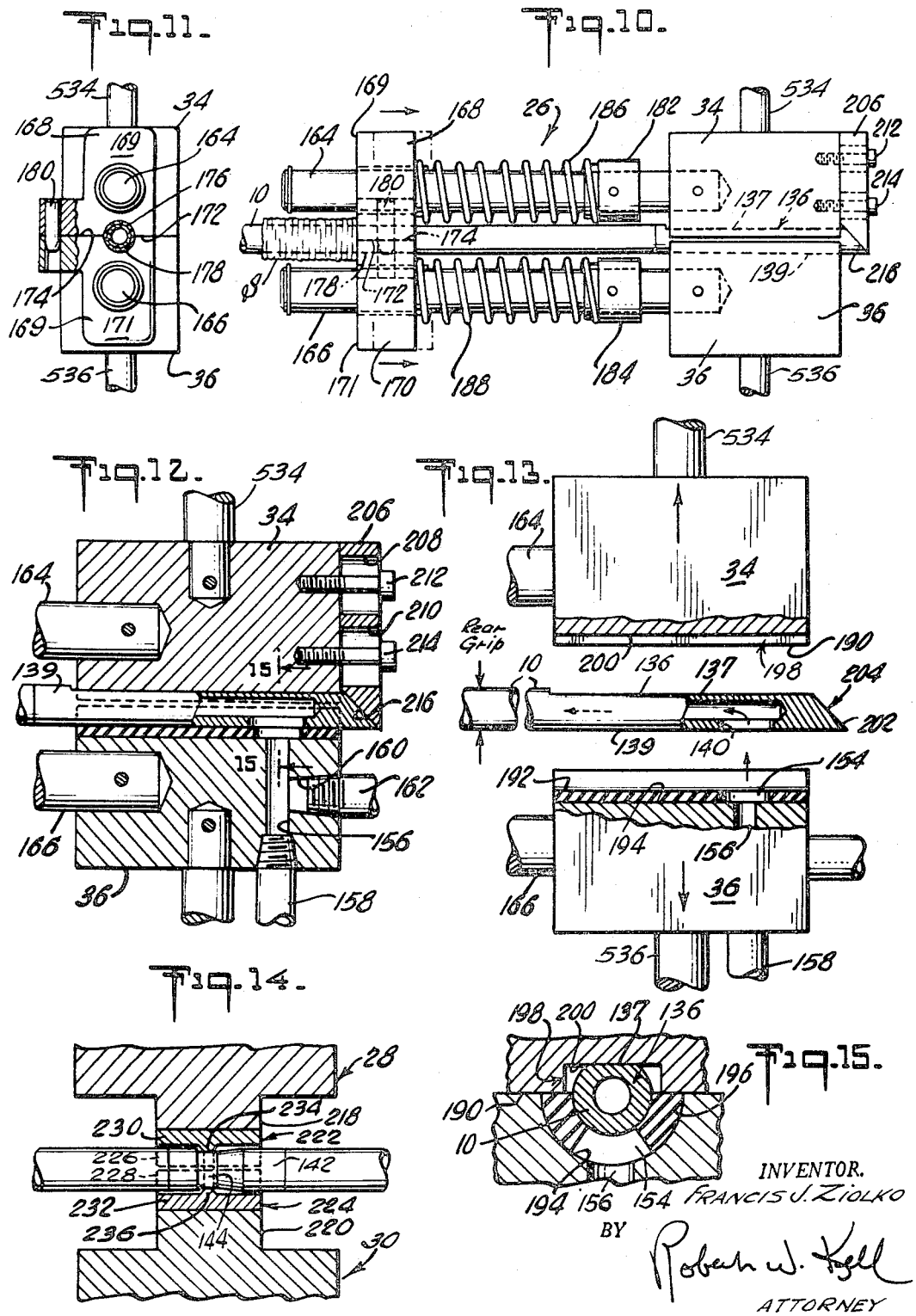

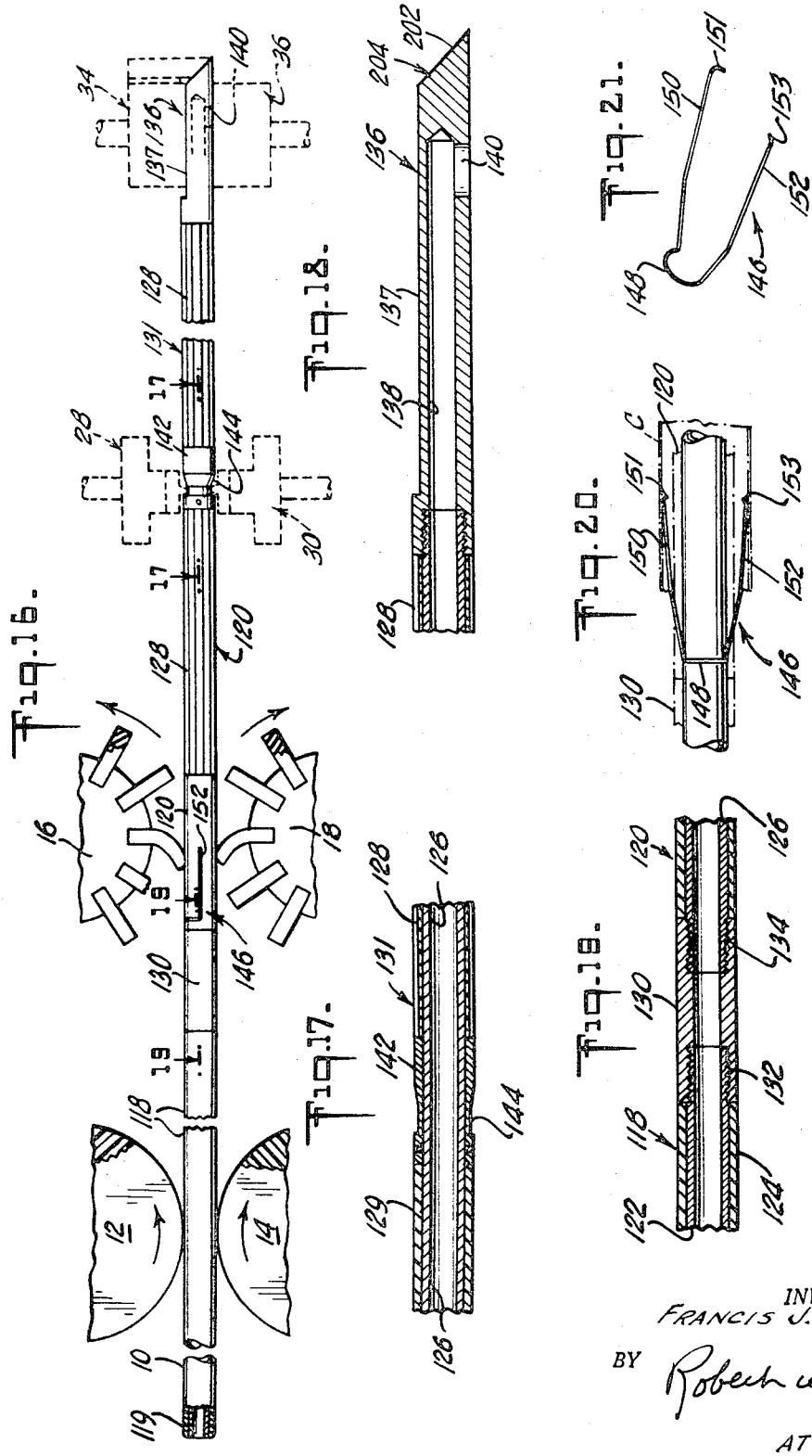

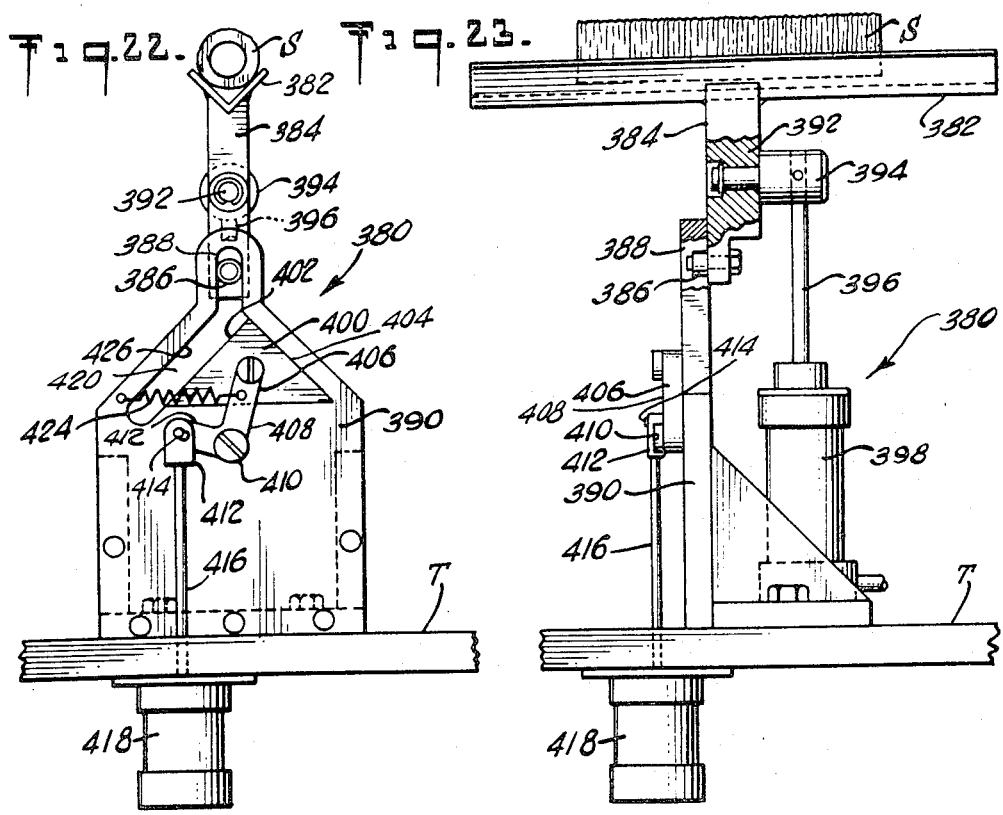
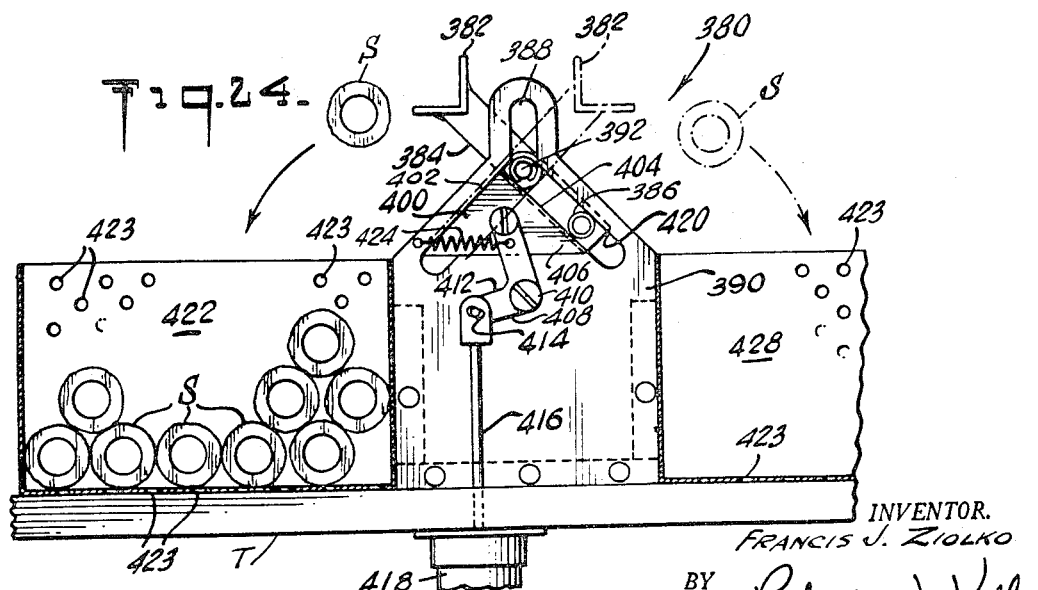

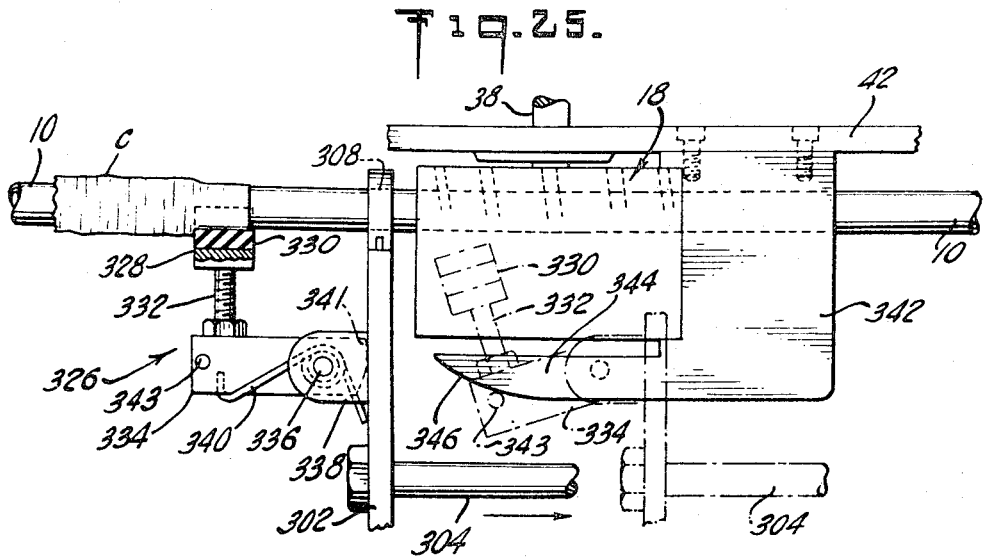
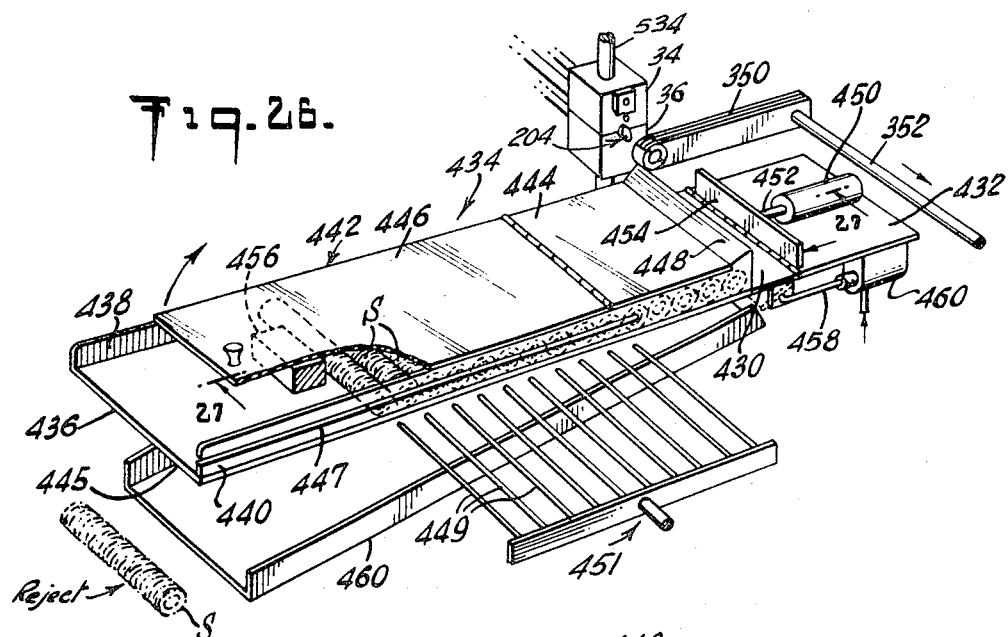
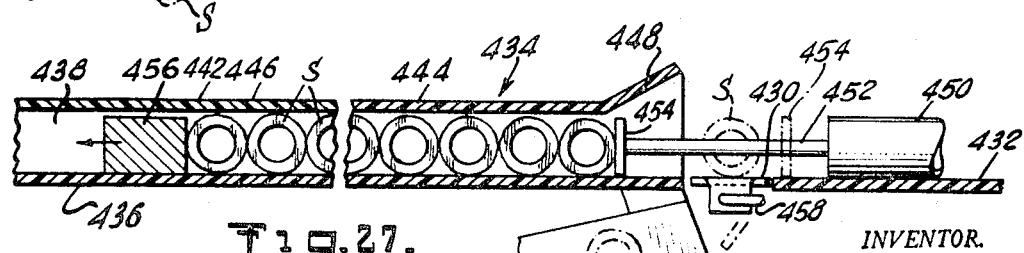

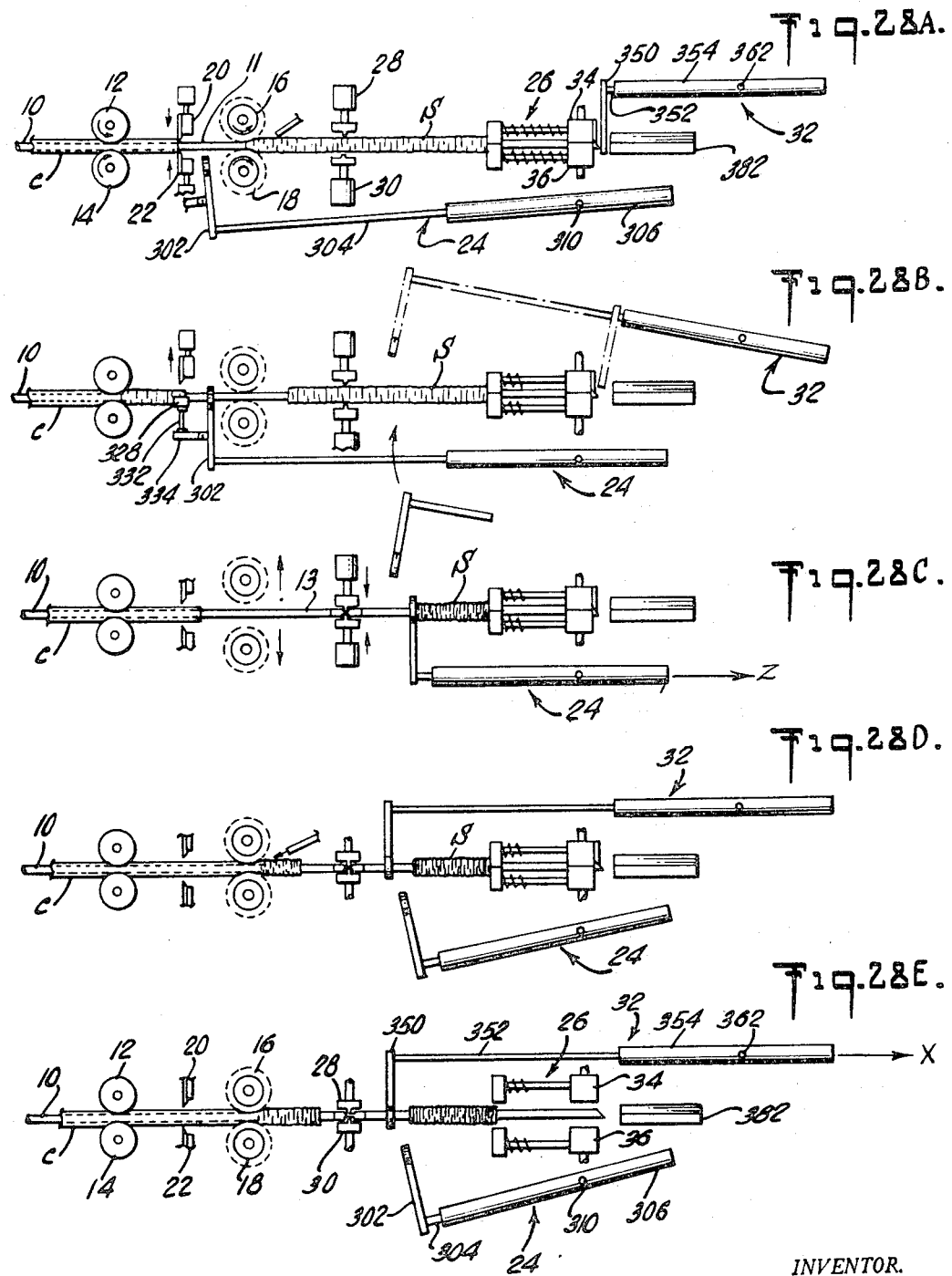

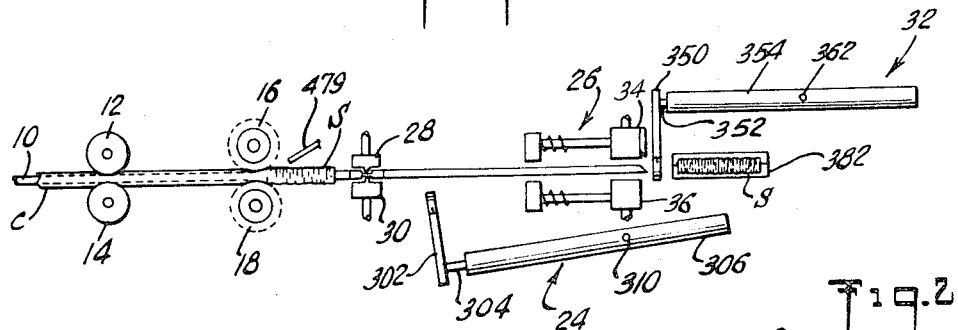
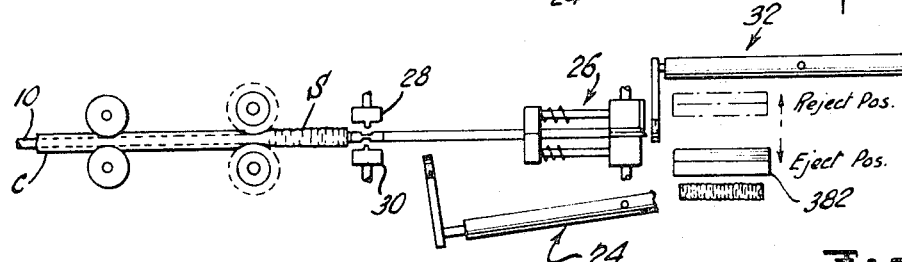
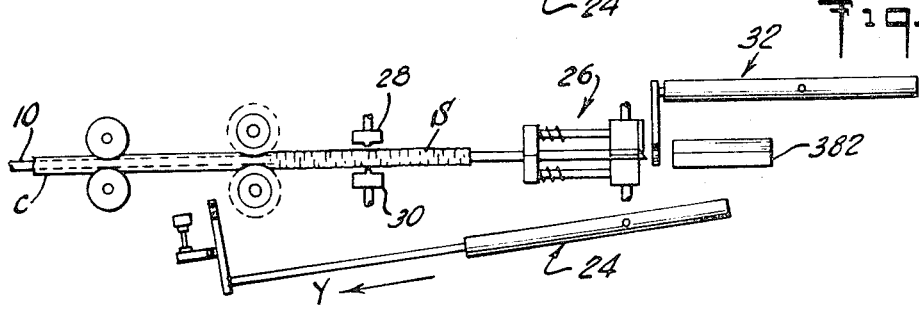
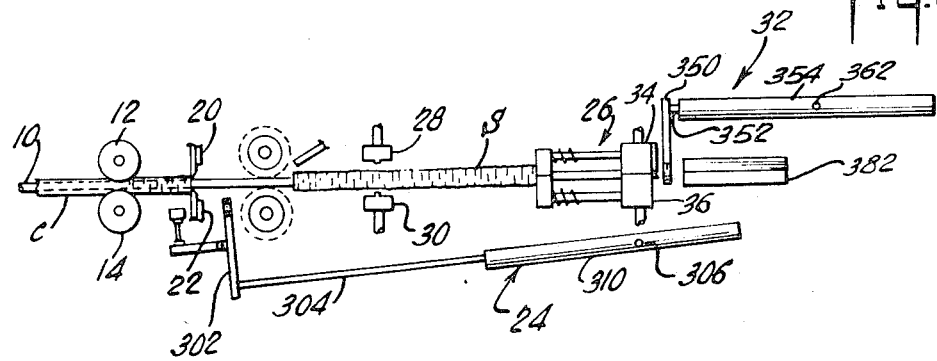

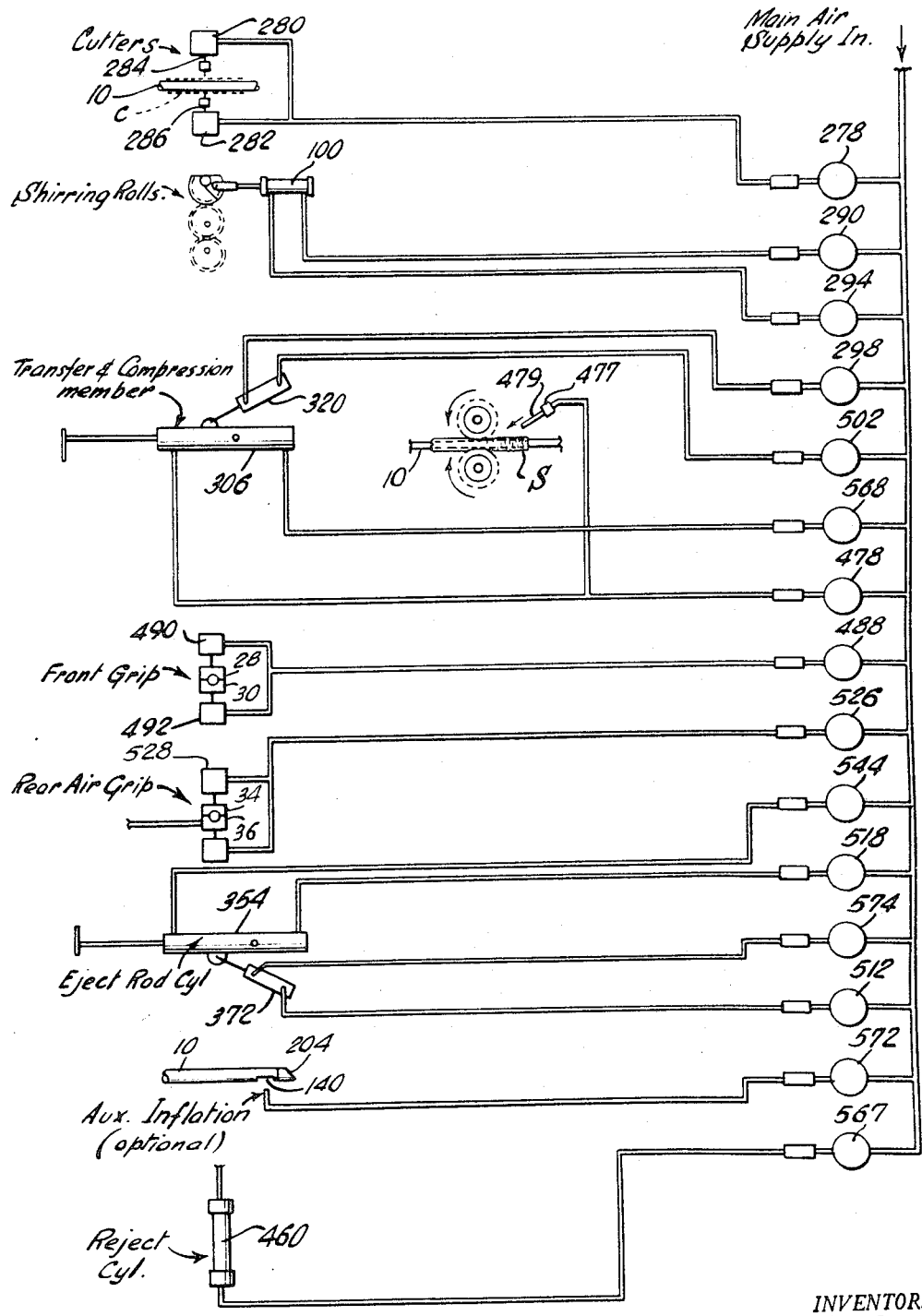

Aug. 27, 1968 F. ZIOLKO 3,399,066
METHOD FOR MANUFACTURING CASING FROM A CONTINUOUS TUBE
Original Filed May 29, 1963 15 Sheets-Sheet 14

INVENTOR.
FRANCIS J. ZIOLKO
BY Robert W. Kell
ATTORNEY

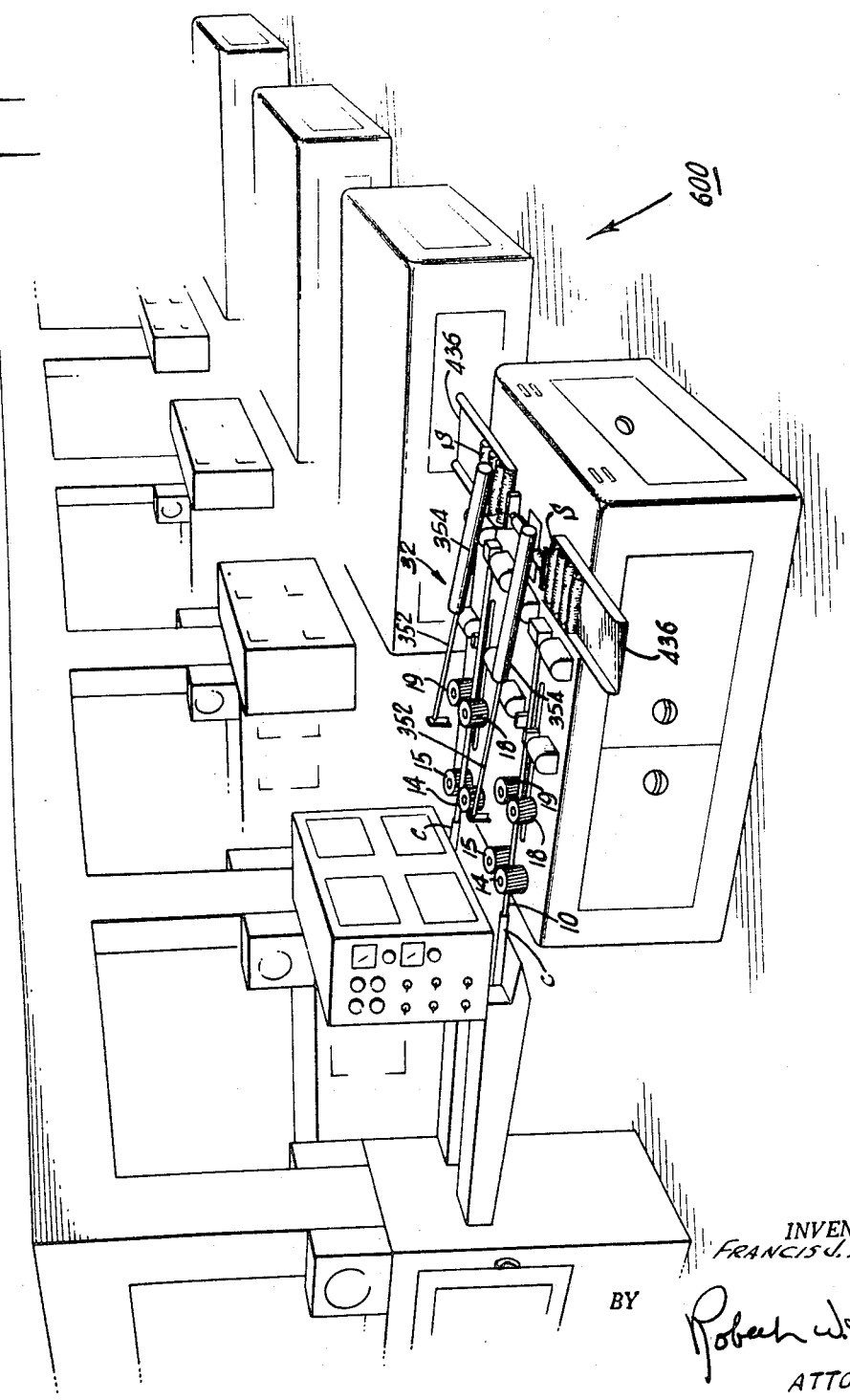

United States Patent Office 3,399,066
Patented Aug. 27, 1968

3,399,066
METHOD FOR MANUFACTURING CASING FROM A CONTINUOUS TUBE
Francis Ziolko, Somerville, N.J., assignor to Johnson & Johnson, a corporation of New Jersey
Original application May 29, 1963, Ser. No. 284,048, now Patent No. 3,315,300, dated Apr. 25, 1967. Divided and this application Dec. 1, 1966, Ser. No. 600,690
3 Claims. (Cl. 99—176)

ABSTRACT OF THE DISCLOSURE

A continuous, inflated collagen tube is shirred on a mandrel disposed axially within the tube by the wiping action of flexible fingers mounted on a pair of coacting, shirring rolls. The diameter of the inflated tube prior to shirring is continuously monitored by contacting the surface of the inflated tube with a dancer roller to provide a signal that is indicative of the diameter of the tube. The shirred tube is cut into discrete lengths, compressed, and delivered to a discharge station where certain links, the diameter of which varies from predetermined limits, is segregated in response to the signal.

---

This application is a division of my copending application Ser. No. 284,048, filed May 29, 1963; now Patent No. 3,315,300, issued Apr. 25, 1967.

The present invention relates to the manufacture of casings from a continuous, inflated tube and, more particularly, to a new and improved method for producing shirred and compressed lengths from a continuous tube of extruded and dried collagen.

The process of the invention is adapted to be used in the production of edible casings for fresh pork sausage, and sausages of the wiener or frankfurter types, the casings being readily edible along with the meat product with which it is stuffed.

Natural casings produced from the intestines of animals, such as sheep, hogs, and cattle, have a number of faults. They are extremely high in bacteria count and, thus, difficult to properly prepare for human consumption. Natural casings fluctuate in availability, price, size, and edibility. Except for some casings derived from sheep, such casings are tough and hard to masticate.

Because of these shortcomings, a number of attempts have been made to produce edible, synthetic casings from protein sources, such as, collagen. A solution to the problem of producing edible, synthetic sausage casings from collagen is shown and described in U.S. Patent No. 3,123,653, granted on Mar. 3, 1964. It has been discovered that an exceedingly thin-walled tube of collagen casing material may be produced from a fluid mass of swollen collagen fibrils having a collagen solids content of the order of at least 2.5 percent, and less than 6 percent, which is much lower than heretofore used in the numerous unsuccessful attempts to produce edible, synthetic casings.

The collagen mass is extruded in the form of a continuous collagen tube, preferably by means of an extruder embodying a pair of oppositely-rotating discs, as shown and described in U.S. Patent No. 3,122,788. The extruded collagen tube is then subjected to a plurality of post-extrusion treatments, including inflating and air-drying to produce a continuous, thin-walled tube of dried collagen, forming sausage casings which are tender and readily cookable and edible. Throughout the entire processing of the extruded collagen tube, great care must be exercised because of the exceedingly fragile and delicate nature of the tubing material. Starting with a solids content of about 4 percent in its freshly extruded form in a typical case, the tubing is eventually reduced to a dried-wall thickness of about .78 mil to form a casing tubing of about 18 millimeters in inflated diameter, all while maintaining said interior diameter substantially constant from extrusion to completion of the drying.

The present invention is characterized by the provision of a novel and improved method for shirring the leading end of said continuous, thin-walled tube of dried collagen, severing the shirred portion thereof into predetermined lengths, and compressing the shirred lengths to form compact, shirred units, and depositing the compressed units into a delivery chute for packaging and heat curing. The shirred, compressed and cured casing lengths can be easily handled and transported, and are ready at any time, without further preparation, to be applied to a stuffing device for filling with sausage emulsion. By way of contrast, heretofore, only non-collagenous synthetic casings; such as, cellulose casings, were available in shirred form.

GENERAL DESCRIPTION

In the manufacture of the synthetic collagen casing with which the present invention is used, the continuous, tubular body of collagen is travelled through a drying chamber in which it is dried to a thin, tubular form by maintaining the length thereof in the chamber inflated to a selected diameter with controlled air pressure, and directing jets of warm, dry air against the exterior thereof as the collagen tube moves through the drier.

Air for inflating the collagen body during its travel through the drying chamber is provided from a hollow shirring mandrel axially disposed within the tubing and onto which the leading end of the dried, inflated collagen body is advanced by a pair of opposed feed rolls, which also serve to pull the tubing through the drier.

The leading end of the dried collagen tube advanced along the shirring mandrel by the feed rolls is engaged by a pair of opposed shirring rolls which pleat or shirr the tubing. The rolls are provided with flexible extensions or fingers of resilient material, such as, rubber, and are formed with relatively long radius of bending to apply a gentle wiping action to the collagen tube.

When a pre-selected length of tubing has been shirred, a cutter device is actuated to sever the shirred section from the leading end of the collagen tube. After the severing operation, the shirring rolls are pivoted away from position adjacent the shirring mandrel to permit entry therebetween of a reciprocating transfer and compression member. This transfer and compression member engages the trailing end of the severed, shirred section and moves it axially along the shirring mandrel away from the shirring zone and against a yieldable abutment adjacent the end of the shirring mandrel remote from the shirring rolls. The transfer and compression member applies an axial force to the shirred section by compressing it against the abutment, thereby reducing the length of the section. The compressive force on the shirred section is maintained while the shirring rolls resume shirring the next section from the leading end of the tube.

Before the conclusion of the next shirring operation, the transfer and compression member releases the compressed, shirred section and returns to position adjacent the shirring rolls to await the next successive shirred section. Substantailly simultaneously with the release of the compressed, shirred section, an ejector member is actuated to engage the compressed, shirred section and strip it from the shirring mandrel into a receiving member.

It is additionally necessary to ensure that the finished shirred casing sections are of collagen tubing having a generally uniform internal diameter, which is the internal diameter of the tubing as extruded and so maintained throughout the wet treatment thereof. There is provided means in the drying chamber itself for controlling the internal, inflating pressure of the air issuing from the shirring mandrel to maintain the internal diameter of the collagen tubing substantially constant during the drying thereof. By so maintaining the diameter of the tubing as it is dried, deleterious stretching or shrinking of the collagen tubing is avoided and a collagen casing is produced having the desired diameter. It has been found that a casing produced from a collagen tube that has been unduly stretched or expanded exhiblits a loss of elasticity, adversely affecting the casing's ability to withstand the stresses or stuffing and linking. A casing from a collagen tube of sub-standard diameter will not yield the proper size sausage when stuffed.

As part of the present invention, there is also provided metering means which likewise assist in ensuring that the finished, shirred casings are of proper diameter, by causing out-sized casing lengths to be sensed and discarded. The metering means of the present invention is located adjacent to the entry of the tubing into the bite of the feed rolls. The collagen tubing is disposed for travel between a pair of relatively-movable rollers, the lower roller being fixed in position while the upper roller, a dancer roller, is mounted for vertical movement following the tubing contour. The dancer roller is adapted to vary a control signal when raised or lowered beyond the selected tubing diameter value.

When the dancer roller senses that a portion of the dried tubing has a greater or smaller inflated diameter than the required inflated casing diameter, the signal variation therefrom energizes a time-delay relay. The time delay relay is adapted, in turn, to actuate a reject member when a selected amount of the tubing diameter is above or below standard. When the shirred length which includes the portion of the collagen tubing of improper diameter is ejected from the shirring apparatus, as described heretofore, such shirred length, rather than being delivered into the receiving member with shirred casings of proper diameter, is delivered by means of the reject member to a reject tray with other casings of improper diameter. Thus, all the shirred casing lengths formed of a collagen tubing having substantially the same desired uniform diameter are separated and segregated from those of improper diameter.

Occasionally, as the inflated collagen tube travels through the drying chamber, it becomes rotated about its central axis and circumferentially twisted. A twisted tubing presents problems in the subsequent shirring and compacting operations, and produces a finished casing length having an unsightly appearance. It may also happen that the tubing becomes so twisted that the inflated tube becomes pinched, interrupting the air flow in the tubing.

To correct any twist that may develop in the dried collagen tubing as it enters the shirring mechanism, there is provided a novel detwister unit which is constructed and arranged to impart to the twisted tubing a twist in the opposite direction, thus, in effect countering the tubing twist and straightening the inflated tubing prior to its engagement by the feed rolls. This novel twister unit includes a pair of vertically-disposed rollers frictionally engaging opposite sides of the inflated collagen tube moving therebetween. One of the rollers is adapted for pivotal movement, and can be pivoted toward or away from the shirring apparatus. By suitably pivoting this movable roller out of co-planar relationship with its coacting roller, a twist can be imparted to the tubing moving between the rollers in a direction opposite to the direction of twist in the tubing. The twist thus effected by the twister unit counteracts the twist in the tubing and properly orients the tubing as it enters between the feed rolls.

The apparatus is simpler and less expensive to construct and maintain than comparable shirring devices heretofore available. In addition, the present invention produces a shirred and compressed casing length having generally more uniform size, appearance, and compactness than previously realized, thereby being easier to handle during stuffing. Further, the structure and operation of the invention lends itself easily to mass production techniques and requirements.

OBJECTS

It is, therefore, an object of the present invention to provide a novle, improved and closely-controlled method for producing shirred, compacted lengths of collagen casing from a continuous, inflated tube of dried collagen.

It is also an object of the invention to provide a novel and improved method for producing predetermined lengths of shirred, compacted collagen casing from the leading end of a continuous, inflated tube of dried collagen, engaging successive shirred and severed casing lengths and moving them to a compression station where an axial compressive force is applied on the shirred casings to reduce their length.

An additional object of the invention is to provide a new method for shirring a continuous, inflated dried collagen tube into compact, shirred casings of a pre-selected length, transferring successive shirred and severed casings lengths to a compression station where an axial compressive force is applied to the shirred casings to reduce the length thereof, and moving the compressed, shirred casings into a receiving memebr.

Another object of the invention is to provide a new and improved method for continuously monitoring the dried tubing diameter as it enters the shirring mechanism, and rejecting any shirred casing length formed of collagen tubing having an internal diameter beyond pre-selected upper or lower limits.

A further object of the invention is to provide a novel method for rotating an inflated, twisted collagen tubing in a direction opposite to the direction of tubing twist, thereby counteracting the tubing twist and straightening the collagen tubing for subsequent shirring, severing, and compressing into shirred collagen casing lengths.

Objects and advantages of the invention will be obvious herefrom, or may be learned by practice with the invention, the same being realized and attained by means of the instrumentalities and combinations pointed out in the appended claims.

The foregoing general description and the following detailed description are exemplary and explanatory, but are not restrictive of the invention.

Of the drawings illustrating, by way of example, a preferred embodiment of the invention:

FIGURE 1 is a perspective view, partly schematic, of a device embodying the present invention.

FIGURE 2 is a perspective view of the metering device and detwister unit of the present invention.

FIGURE 3 is a plan view of the mechanism shown in FIGURE 1.

FIGURE 4 is a side elevation of the embodiment of the mechanism shown in FIGURE 3.

FIGURE 6 is a side elevation of the feed and shirring roll drive mechanism shown on the opposite side from that shown in FIGURE 4.

FIGURE 7 is a sectional view taken along line 7—7, FIGURE 6, showing the shirring rolls inoperative, closed, shirring position.

FIGURE 8 is a sectional view similar to FIGURE 7, but illustrating the shirring rolls in nonoperative, open position.

FIGURE 9 is a sectional view taken along line 9—9, FIGURE 6.

FIGURE 10 is a detailed side elevation of the shirring mandrel rear support members and associated elements.

FIGURE 11 is a front view of the mechanism shown in FIGURE 10.

FIGURE 12 is a cross-sectional, side view of the shirring mandrel rear support members, shown in closed, operative mandrel support position.

FIGURE 13 is a side elevation, partly in section, of the mandrel rear support members, shown in open, non-operative position.

FIGURE 14 is a detailed view, partly in section, of the mandrel front support members, shown in mandrel support position.

FIGURE 15 is a sectional view taken along lines 15—15, FIGURE 12.

FIGURE 16 is a side elevation of the shirring mandrel with the feed rolls and shirring rolls shown partly in section, and the front and rear mandrel support members shown in phantom.

FIGURE 17 is a sectional view taken along lines 17—17, FIGURE 16.

FIGURE 18 is a longitudinal, sectional view of the mandrel end piece.

FIGURE 19 is a sectional view taken along lines 19—19, FIGURE 16.

FIGURE 20 is a plan view of the portion of the shirring mandrel disposed between the shirring rolls.

FIGURE 21 is a perspective view of the shirring mandrel casing hold-off clip.

FIGURE 22 is a front view of the casing-receiving and depositing mechanism.

FIGURE 23 is a side elevation of the mechanism shown in FIGURE 22.

FIGURE 24 is a front view of the mechanism shown in FIGURE 22, illustrating the mechanism in casing-deposit position.

FIGURE 25 is a plan veiw of a portion of the transfer and compressor member, illustrating the tubing gripper element thereof and its associated structure.

FIGURE 26 is a perspective view of a modified form of casing-receiving and depositing mechanism.

FIGURE 27 is an enlarged, lengthwise, cross-sectional view of the mechanism shown in FIGURE 26.

FIGURES 28A–28I illustrate schematically the successive operations performed by the invention.

FIGURE 29 is a schematic diagram of a suitable pneumatic control system for the invention.

FIGURE 32 is a perspective view of a modified form of the invention as adapted to a production line, wherein the mechanism of the invention is shown mounted horizontally rather than on the vertical support of FIGURE 2, and with two adjacent side-by-side units.

Figure 5:
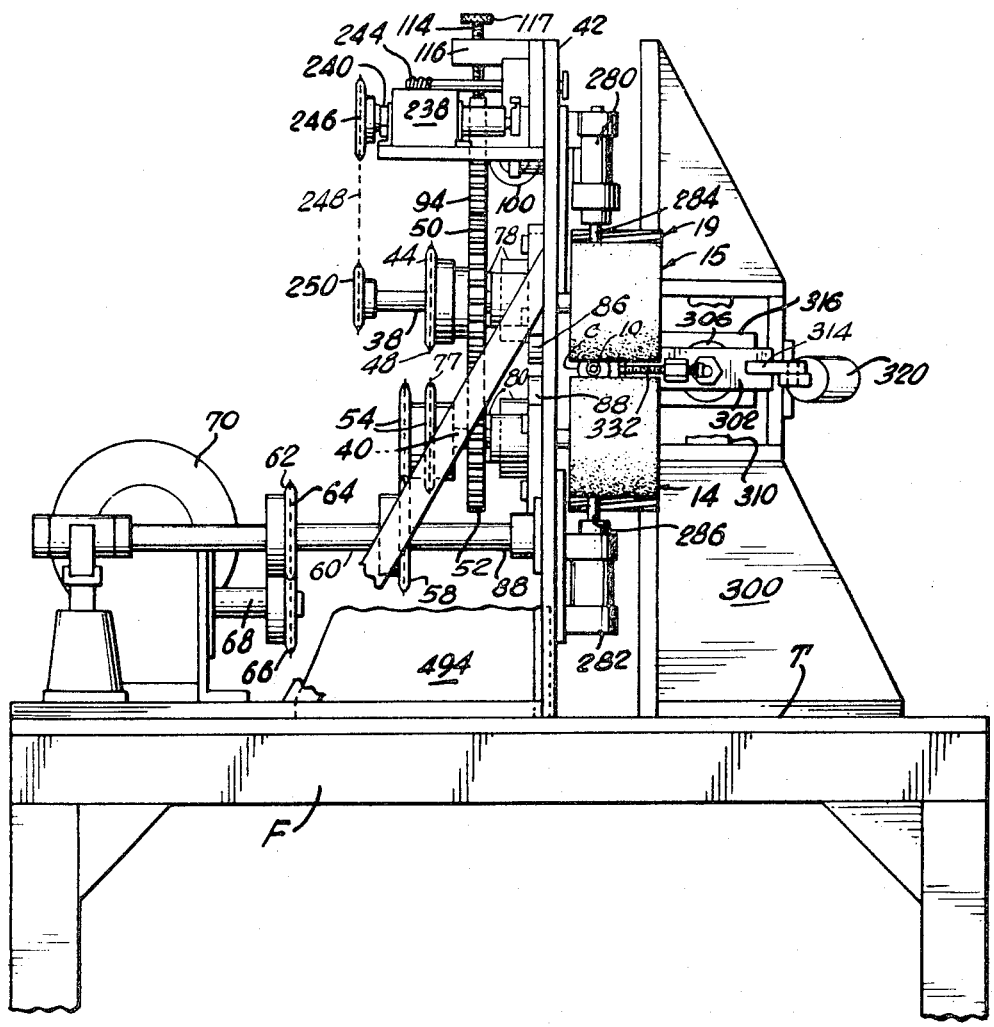
FIGURE 5 is a front view, partly broken away, of the mechanism shown in FIGURE 4.

Referring now to the drawings wherein there is illustrated the preferred form of the invention, FIGURE 1 illustrates somewhat diagrammatically the structure of the present invention, while FIGURES 28A–28I illustrate schematically the cyclic shirring operation performed by the mechanism of the invention.

The tubular body C, produced and processed as described in U.S. Patent Nos. 3,123,653 and 3,122,788, is travelled through a suitable drying chamber (not shown) and a rehumidification chamber R (see FIGURE 2). Having now acquired its final dimensions, body C is disposed about an axially-disposed hollow shirring mandrel 10, which forces pressurized air into body C for inflating it as it passes through the drier and rehumidification chamber R and onto mandrel 10.

To assist in feeding the dried body C along shirring mandrel 10, there is provided a pair of feed rolls 12 and 14 mounted, respectively, above and below shirring mandrel 10. Rolls 12 and 14 are provided with resilient coverings 15 of silicone rubber or similar resilient material which embrace the tubing C from above and below, compressing it against the exterior surface of shirring mandrel 10. In addition, rolls 12 and 14 draw body C through the drying chamber and feed the leading end thereof along shirring mandrel 10 to a pair of co-acting shirring rolls 16 and 18, which form pleats or folds in the leading end thereof. Rolls 12 and 14 are so constructed and disposed that a small amount of air leaks past rolls 12 and 14 to maintain inflated the portion of tubing C between feed rolls 12 and 14 and shirring rolls 16 and 18. (See FIGURE 1.) This section of tubing C is kept inflated to facilitate the shirring operation.

Rolls 16 and 18, are preferably provided with shirring members disposed angularly to the roller axes like those disclosed in Mayer Patent No. 1,302,194, being provided with a plurality of helically-disposed peripheral fingers or wipers 19 which frictionally engage opposed portions of the outer surface of tubing C. Unlike said Mayer patent, however, fingers 19 are formed of very flexible material, such as, sponge rubber, and are constructed with a relatively, long radius of bending so as to apply a gentle, prolonged wiping action progressively to the thin, fragile, and delicate collagen tube C engaged thereby.

Referring specifically to FIGURES 28A–28I, which disclose sequentially the operations of the mechanism of the present invention, when a pre-determined length of tubing has been shirred onto mandrel 10 by rolls 16 and 18, a pair of opposed cutters 20 and 22 are actuated, as described hereinafter in detail, and travel toward mandrel 10 and into engagement with the tubing C immediately before it passes between shirring rolls 16 and 18. These cutters 20 and 22 sever the shirred section S at the leading end of tubing C from the remainder thereof.

As the cutters 20 and 22 are withdrawn from operative severing position adjacent mandrel 10, a transfer and compressor member, designated generally 24, is energized and moved laterally toward and against mandrel 10 in an exposed section 11 thereof between feed rolls 12 and 14 and shirring rolls 16 and 18, between the trailing end of shirred section S and the leading end of tubing C (see FIGURE 1 and 28B).

The transfer and compressor member 24 is then travelled in the direction of arrow Z, FIGURE 28C, to move shirred section S away from the shirring rolls 16 and 18 and axially compress it at a compression station on mandrel 10 against a yieldable barrier 26 temporarily positioned in the path of travel of section S along mandrel 10.

To permit passage of member 24 therepast, shirring rolls 16 and 18 are moved away from mandrel 10 and out of contact therewith during the transfer of section S along mandrel 10 to barrier 26.

To assist in supporting mandrel 10 during the period that shirring rolls 16 and 18 are out of operative shirring position, there is provided a pair of opposed, front gripper units 28 and 30 which are disposed between shirring rolls 16 and 18 and barrier 26. Gripper units 28 and 30 are actuated and moved into gripping engagement with an exposed section 13 of mandrel 10 as transfer member 24 moves therepast toward barrier 26.

Gripper units 28 and 30 remain in gripping engagement with mandrel 10 as shirring rolls 16 and 18 are returned to operative shirring position and start to shirr the next section S on the leading end of tube C. With shirring rolls 16 and 18 returned to shirring position, transfer and compressor member 24 is moved out of engagement with shirred section S to await the next shirring cycle.

As member 24 is moved away from mandrel 10 and section S, an ejector member 32 is actuated and moved into engagement with mandrel 10 between front grips 28 and 30 and the trailing end of shirred section S. With ejector 32 adjacent mandrel 10, the rear mandrel support grips 34 and 36, through which air to mandrel 10 is supplied, and by means of which mandrel 10 is normally supported, are moved away from mandrel 10 and out of gripping engagement therewith. This movement of grips 34 and 36 provides an unobstructed path for the ejection of shirred section S from the mandrel 10. However, front gripper units 28 and 30 are still in gripping engagement with mandrel 10 and are supporting it while rear grips 34 and 36 are temporarily out of mandrel support position.

With its path cleared, ejector 32 is moved in the direction of arrow X, FIGURE 28E, to remove shirred section S from mandrel 10. At the end of the travel of ejector 32 in the direction of arrow X, and completion of the casing removal, rear gripper units 34 and 36 are returned to operative mandrel gripping engagement and front gripper units 28 and 30 are moved away from mandrel 10, clearing the path for the next successive shirred portion at the leading end of tubing C as it travels along mandrel 10.

Simultaneously with the de-actuation of front grips 28 and 30, transfer member 24 is travelled in the direction of arrow Y, FIGURE 28H, to return transfer member 24 to its original position to await transfer and compression of the next shirred section S.

FEED AND SHIRRING ROLL SUPPORT AND DRIVE MECHANISMS

Referring now in detail to FIGURES 1–9 which illustrate one embodiment of the invention, referring to FIGURE 1 feed rolls 12 and 14 are mounted on the ends of shafts 38 and 40, respectively, both supported in suitable bearings in mounting plate 42 carried by the main machine frame F. To rotate shaft 38, there is provided at its free end a sprocket 44, about which is trained an endless chain 48 for reasons hereinafter set forth.

To transmit rotation from shaft 38 to shaft 40, there is also provided on shaft 38 a gear element 50 which is in meshing engagement with a similarly constructed gear element 52 fixed to shaft 40.

The end of shaft 40 remote from feed roll 14 has mounted thereon a double-tract sprocket 54, about one track of which is trained an endless drive chain 56. Chain 56 also passes around a sprocket 58 fixed to one end of transmission shaft 60. The other end of shaft 60 is provided with a sprocket 62 with an endless chain 64 trained there-around. Chain 64 also passes around sprocket 66 fixed to the output shaft 68 of a suitable power source, such as, a gear reduction motor 70, which is energized by an operator at the start of the machine operations.

In operation, gear 52, coupled in driven relationship with motor 70, effects equal but opposite rotation of its meshing gear 50 and, as shaft 40 is rotated by motor 70, shaft 38 is also rotated thereby but in an opposite direction, rotating rolls 12 and 14 in the respective directions indicated by the arrows in FIGURE 1. Thus, rolls 12 and 14, rotating in opposite directions, effect travel of tubular body C along mandrel 10.

Shirring rolls 16 and 18 are, in turn, mounted on the ends of shafts 72 and 74 respectively. Shirring rolls 16 and 18 are preferably driven in synchronism with rolls 12 and 14. To accomplish this, a sprocket 76 is fixed to shaft 72 and endless chain 48 trained therearound. Since chain 48 also passes around sprocket 44 on shaft 38, rotation of shaft 38, in turn, rotates shaft 72 also and in the same direction as shaft 38.

In like manner, shaft 74 is provided at the end thereof remote from roll 18 with a sprocket 75 about which is trained an endless chain 77. Chain 77 also passes around the other track of sprocket 54 thus coupling shafts 40 and 74 for rotation in the same direction.

To provide for the movement of shirring rolls 16 and 18 toward and away from mandrel 10, shafts 72 and 74 (see FIGURES 7 and 8) are each eccentrically mounted and rotatably supported in outer sleeve members 78 and 80 respectively. Sleeves 78 and 80 are rotatably mounted in suitable accommodating openings 82 and 84 respectively in plate 42, and are each additionally supported in suitable bearings 86 and 88 fixed to plate 42.

Sleeves 78 and 80 are, in turn, provided at the ends thereof remote from rolls 16 and 18 with meshing gear members 90 and 92 respectively (see FIGURE 6) each of which is similar in construction and fixed to and rotatable with its associated sleeve. To effect rotation of gears 90 and 92 and thus their associated sleeves 78 and 80, gear 90 is also in meshing engagement with a gear sector 94 rotatably supported on a stub shaft 96 carried by plate 42. Gear sector 94, in turn, is pinned to the free end of cylinder rod 98 of a suitable pneumatic cylinder 100 secured to plate 42.

When, during the cyclic operation of the machine, cylinder 100 is actuated, as hereinafter described, cylinder rod 98 thereof is extended rotating gear sector 94 in the direction indicated by the arrow thereon in FIGURE 6.

Since gear sector 94 and gear 90 and gears 90 and 92 are in meshing engagment, this rotation of sector 94 in turn effects rotation of gears 90 and 92 in the directions respectively indicated by the arrows thereon in FIGURE 6. This rotation of gears 90 and 92 in turn rotates sleeves 78 and 80 fixed thereto in like direction. However, since shafts 72 and 74 are eccentrically supported in sleeves 78 and 80, rotation of the sleeves 78 and 80 in such directions, effects movement of shafts 72 and 74 away from each other and thus, moves shirring rolls 16 and 18 apart and out of operative shirring position adjacent mandrel 10 as shown in FIGURE 8.

When during the shirring cycle shirring rolls 16 and 18 are to be returned to operative shirring position, cylinder 100 is deenergized retracting its rod 98 and thus reversing the direction of rotation of sector 94, gears 90 and 92, and sleeves 78 and 80 described heretofore, thereby returning shirring rolls 16 and 18 to operative shirring position shown in FIGURES 1 and 7.

Sprockets 44 and 54 are similar in diameter and construction, as are gear elements 50 and 52, so that feed rolls 12 and 14 rotate at the same speed continuously as long as motor 70 is energized, while shirring rolls 16 and 18 likewise rotate at the same speed continuously as long as motor 70 is energized, since sprockets 75 and 76 are similar in diameter and construction. Further, it has been found desirable to maintain a degree of tension on the tubing C in the portion thereof between the feed rolls 12 and 14 and the shirring rolls 16 and 18. To provide this tension, sprocket 76 is of a smaller diameter than its associated sprocket 44, while sprocket 75 is of a smaller diameter than its associated sprocket 54.

Preferably, the diameters of sprockets 44 and 54 are about 50 percent larger than the diameters of sprockets 76 and 75. Thus, every revolution of sprockets 44 and 54 effects 1½ revolutions of sprockets 76 and 75. For every revolution of feed rolls 12 and 14, shirring rolls 16 and 18 complete 1½ revolutions. Therefore, tubing C is being shirred faster than it is being fed and, accordingly, a controlled degree of tension or stretch is applied to the tubing section between feed rolls 12 and 14 and shirring rolls 16 and 18. It will be understood that the degree of tension applied can be readily altered to any desired amount by changing the relative gear ratios of sprockets 44, 54, 75, and 76.

To furnish the desired tension on chains 48 and 77, there are provided tension sprockets 102 and 104, one for each chain. Sprockets 102 and 104 (see FIGURE 6) each rotatably secured to an associated lever arm 106 and 108 pivotally mounted on plate 42 and biased by an associated spring 110 and 112 to urge sprockets 102 and 104 into normal, resilient engagement with their associated chains.

In like manner, means are also provided for adjusting the operative position of rolls 16 and 18 (see FIGURES 6, 7, and 8). Said means include an elongated adjusting member 114 threaded for travel through a support block 116 on plate 42 adjacent sector 94. One end 115 of member 114 bears against sector 94 as shown in FIGURE 6. The other end of member 114 is provided with an actuating head 117 such that, when head 117 is suitably rotated, member 114 is travelled through block 116 to urge end 115 thereof against sector 94 thus pivoting sector 94 about shaft 96. This, in turn, rotates gears 90 and 92 and sleeves 78 and 80 to suitably locate rolls 16 and 18 in proper adjusted operative shirring position.

MANDREL CONSTRUCTION

Turning to FIGURES 16-21, there is illustrated the preferred form of mandrel 10 which is formed in two separate matching sections 118 and 120. Section 118 comprises an inner metallic sleeve 122 with a smooth outer covering 124, while section 120 includes an inner metallic sleeve 126 with a fluted or longitudinally-ribbed outer covering 128. Preferably, section 120 is of slightly smaller outer diameter than section 118. This coupled with the fluting of covering 128 results in a substantial reduction in frictional drag of the shirred casing travelled along section 120. It will be understood that the pleated casing section S exhibits greater resistance to travel along mandrel 10 than does the inflated, unpleated tubing C. Thus, mandrel 10 includes the fluted section 120 in that portion thereof past the shirring area and over which shirred section S travels. However, to minimize frictional resistance, over the entire mandrel length, coverings 124 and 128 are both of material having a low coefficient of friction, such as, one of the tetrafluoroethylene resins.

The leading end 119 of first section 118 is preferably tapered to facilitate insertion into tubular body C. First section 118 is coupled to second section 120, adjacent the location of shirring rolls 16 and 18, by means of a hollow, metallic coupling 130 threaded at each end thereof to accommodate cooperating threaded sections 132 and 134 on sleeves 122 and 126 respectively.

The end of section 120 remote from rolls 16 and 18 and adjacent rear grip blocks 34 and 38 is secured to an air inlet section 136 which is preferably of metal closed at the end thereof remote from section 120 (FIGURES 16 and 18). Air inlet section 136 is provided with an internal bore 138 which communicates adjacent the closed end with a transverse air inlet port 140. Port 140 is adapted to cooperate with an air inlet bore 156 in rear grip 36 to normally admit air under pressure into the hollow interiors of sections 118 and 120 of mandrel 10 (FIGURES 12 and 13). For reasons explained in more detail hereinafter, the top surface 137 of section 136 is flat rather than rounded to facilitate gripping by block 34.

Mandrel 10 also includes adjacent the area of operation of front grips 28 and 30 an outer metal sleeve 142 attached as by silver soldering to inner metal sleeve 126 (see FIGURES 16 and 17). The two sections 129 and 131 of outer, fluted, plastic sleeve 128 abut the front and rear edges of sleeve 142. Sleeve 142 also includes an annular groove 144 formed therein to accommodate the operative gripping portions of blocks 28 and 30.

It will be understood that mandrel 10 includes outer metallic sections 130, 136, and 142 adjacent the areas of operation along mandrel 10 of the shirring rolls 16 and 18, the rear grips 34 and 36 and the front grips 28 and 30 respectively to avoid the undue wear which the outer plastic covering would experience at such operative areas as a result of the intermittent frictional engagement of the mandrel 10 by these elements during the cyclic operation of the machine (see FIGURE 16).

It has been found desirable to keep tubing C centered on mandrel 10 as it is engaged by shirring rolls 16 and 18, thereby ensuring a uniform shirring operation. To assist in keeping tubing so centered, there is provided on mandrel 10 adjacent the entry of tubing C into the shirring zone, a casing alignment and tensioning member 146 seated on coupling 130 (FIGURES 16, 20, and 21). Member 146 includes an arcuate section 148 curved to conform to the upper contour of coupling 130 and is fixed to coupling 130 as by soldering to securely seat member 146 in position on mandrel 10. Member 146 also includes a pair of lateral extensions 150 and 152 of section 148 which are disposed on opposite sides of mandrel 10 when member 146 is seated thereon (see FIGURE 16). Sections 150 and 152 are preferably coplanar and are positioned in a common plane transverse to the plane of section 148.

In addition, the free ends 151 and 153 of sections 150 and 152 respectively are divergent so that ends 151 and 153 are spaced from their associated sides of mandrel 10. In operation, as shown best in FIGURE 20, member 146 is seated on mandrel 10 inside tubular body C. The lateral extensions 150 and 152 have their free ends 151 and 153 in slight contact with opposite sections of the inner wall of tubing C as it moves therepast on its way to the shirring rolls 16 and 18. This arrangement thus keeps the side walls of tubing C in spaced relationship relative to mandrel 10 and thereby centered thereon as the tubing C enters the shirring area.

In addition, member 146 provides a small degree of internal tension in tubing C just as it enters the bite of rolls 16 and 18 to eliminate any premature tubing wrinkles and thus assists in producing a uniformly, shirred section S.

MANDREL AIR SUPPLY

Air under pressure is preferably introduced into tubing C at the start of the drying operation and tubing C is preferably maintained inflated during its travel through the drying chamber, rehumidification chamber and during the shirring operation. In the preferred form of the invention, air is introduced into tubing C through the hollow interior of mandrel 10. To accommodate the passage of air therethrough mandrel 10, as described hereinabove (see FIGURES 17, 18, and 19), includes communicating sleeves 122 and 126 and air inlet bore 138. In turn, bore 138 cooperates with port 140 to admit air under pressure into the hollow interior of mandrel 10.

As shown best in FIGURES 12 and 13, port 140 forms an extension of cooperating port 154 when rear grips 34 and 36 are in operative mandrel gripping position. In turn, port 154 communicates with bore 156 in grip 36, in turn, suitably connected to air inlet line 158. To control the air pressure in line 158 and thus the air pressure emitted from mandrel 10, any suitable control means may be used. It will be understood that when, during the cyclic operation of the machine, grips 34 and 36 are in operative gripping position as shown in FIGURE 12, air under pressure is normally fed through line 158, bore 156 and port 154 into and through port 140, bore 138 and sleeves 126 and 122, exiting from tapered front end 119 of mandrel 10 into the tubing C to inflate the tubing during the several steps described above.

During the machine cycle, grips 34 and 36 are moved away from mandrel 10 and out of operative position (see FIGURE 13). With grips 34 and 36 in open position, it may be desirable to provide an auxiliary air supply to maintain tubing C in inflated condition in the drier. To provide for this auxiliary air supply, an auxiliary air line port 160 and air line 162 are provided for temporarily directing pressurized air from a source of supply (not shown) toward and into port 140 and bore 138. It will be understood that grips 34 and 36 are out of operative gripping position for only a relatively short period during the shirring cycle, e.g., as the shirred section is ejected. Therefore, it is not always necessary to include an auxiliary air supply to keep tubing C inflated. However, port 160 and line 162 are provided in the event they may be necessary to continuously maintain the tubing in proper inflated condition (see FIGURE 12).

YIELDABLE BARRIER

Referring to FIGURES 10-13, preferably yieldable barrier 26 and rear grip members 34 and 36 are constructed and operate as a unit. Barrier 26 includes a pair of spaced support rods 164 and 166 supported by grips 34 and 36 respectively. Rods 164 and 166 extend from their associated grip members 34 and 36 in a direction parallel to the longitudinal axis of mandrel 10 and toward shirring rolls 16 and 18. Slidably mounted on rod 164 is a casing stop block 168 while slidably mounted on rod 166 is a second cooperative casing stop block 170. Blocks 168 and 170 have cooperating adjacent faces or edges 172 and 174 including opposed arcuate sections 176 and 178 corresponding in shape to opposite halves of mandrel 10.

As shown best in FIGURE 11, when blocks 168 and 170 are in operative assembled relationship on rods 164 and 166, edges 172 and 174, except for arcuate sections 176 and 178 thereof meet in the plane including the central axis of mandrel 10. Sections 176 and 178 are opposed, forming an access opening through blocks 164 and 166 for section 120 of mandrel 10. Thus while stop blocks 168 and 170 freely accommodate mandrel 10 therethrough, faces 169 and 171 form a barrier for shirred section S travelled along mandrel 10 by transfer member 24, defining a compression station therefor.

Blocks 168 and 170 are pinned together by dowel pin 180 for conjoint sliding movement along their respective rods 164 and 166. Barrier 26 also includes means normally biasing blocks 168 and 170 into operative casing engaging position (shown in full lines, FIGURE 10). Said means includes collars 182 and 184 fixed in position on their associated rods 164 and 166 and springs 186 and 188. Spring 186 is disposed about rod 164 between stop block 168 and collar 182, resiliently urging block 168 into operative position. Spring 188, in turn, encircles rod 166 between collar 184 and stop block 170, normally maintaining block 170 in operative position also.

REAR GRIP MEMBERS

Turning to FIGURES 12, 13, and 15, rear grip members 34 and 36 are preferably of metal. The operative gripping surface 192 of member 36, however, includes an elongated, curved section 194 preferably having a lining 196 of resilient material; such as, sponge rubber. Section 194 adapts member 36 to suitably accommodate the lowermost curved portion 139 of section 136 when in operative gripping position.

The operative gripping surface 190 of member 34, on the other hand, is provided with an elongated keyway 198. The top, planar surface 200 of keyway 198 is adapted to engage flat surface 137 of section 136 of mandrel 10 when gripper member 34 is in operative gripping position. By providing cooperating coplanar surfaces 137 and 200, proper gripping engagement between mandrel 10 and members 34 and 36 is effected. The flat surfaces 137 and 200 prevent rotation of mandrel 10 when gripped by members 34 and 36. In addition, these flat surfaces 137 and 200 coact to properly re-orient mandrel 10 upon re-engagement of mandrel 10 and grip 34 in the event mandrel 10 is rotated about its central axis when grips 34 and 36 are in open, non-operative position.

Means are also provided to ensure proper alignment of port 140 of section 136 and port 154 of grip 36. This includes an inclined cam face 202 formed on the free, terminal end 204 of section 136. As shown best in FIGURE 12, cam face 202 is constructed and arranged to extend beyond the confines of grips 34 and 36. Cooperating with cam face 202 is a cam block 206 adjustably secured by means of slots 208 and 210 and bolts 212 and 214 to top grip 34. Cam block 206 also has a cam face 216 adapted to complement cam face 202 and engage face 202 when grip block 34 is in operative gripping position as shown in FIGURE 12.

It will be understood that in the event mandrel 10 shifts longitudinally to the right as viewed in FIGURE 12 when grip blocks 34 and 36 are in open position, upon return of grip blocks 34 and 36 to operative gripping position, cam face 216 on block 206 engages cam face 202 on mandrel 10, urging mandrel 10 back to properly seated position in grip blocks 34 and 36, thus ensuring proper alignment of the cooperating air inlet ports 140 and 154.

FRONT GRIP MEMBERS

Turning now to FIGURE 14, there is illustrated the preferred form of front grip members 28 and 30. Members 28 and 30 are preferably of metal and each includes a stepped flange section 218 and 220 respectively. Flanges 218 and 220 have cooperating adjacent edges or surfaces 222 and 224 including opposed arcuate sections 226 and 228 corresponding in shape generally to opposite halves of mandrel 10. To ensure proper gripping engagement with mandrel 10, sections 226 and 228 each include a metal lining 230 and 232 respectively (see FIGURES 1 and 14). In addition, each lining 230 and 232 includes a stepped or ridge 234 and 236 respectively adjacent the middle of their associated sections 226 and 228. Ridges 234 and 236 are adapted to be positioned in gripping engagement with groove 144 on sleeve 142. Ridges 234 and 236 are adapted to be positioned in cooperative gripping engagement with groove 144 on sleeve 142. By providing ridges 234 and 236 and cooperating groove 144, mandrel pin is adapted to be properly aligned in gripping engagements by members 28 and 30. Ridges 234 and 236 and associated groove 144 are operative to properly align mandrel 10, even through the mandrel has shifted slightly during the shirring operation.

TRANSFER AND COMPRESSOR MEMBER

Turning to FIGURES 1–4 and more particularly to FIGURE 25, there is illustrated the preferred form of transfer member 24 which is supported by bracket 300 fixed to the machine table T. Member 24 includes a casing engaging member 302 supported transversely at one end on the piston rod 304 of a double-acting air cylinder 306. The free end of member 302 has formed therein an arcuate opening 308 to freely accommodate therethrough mandrel 10 as member 302 is travelled along mandrel 10 during the transfer operation. Cylinder 306 is pivotally supported adjacent its mid-point on swivel 310 carried by bracket 300 (see also FIGURES 28A to 28I). To assist in supporting member 302 and rod 304 when in fully extended position as shown in FIGURE 1, the end 312 of member 302 remote from mandrel 10 is slidably mounted on a support bar 314 which extends parallel to the line of travel of rod 304 and is, in turn, mounted on spaced transverse plates 316 and 318 carried on cylinder 306. The rod support bar 314 thus supports rod 304 and member 302 but is also mounted for pivotal movement therewith about swivel 310.

To effect movement of cylinder 306 and its associated elements about swivel 310 toward and away from mandrel 10, there is provided a second air cylinder 320 pivotally mounted to a swivel support 321 on bracket 302'. The external end 322 of the piston rod 324 of cylinder 320 is, in turn, pivotally fixed to bar 314 between plates 316 and 318. Thus any extension or retraction of rod 324 pivots cylinder 306 about swivel 310 to move casing engageing member 302 laterally into and out operative casing engaging position adjacent mandrel 10.

To assist in moving the leading end of tubing C into the range of operation of shirring rolls 16 and 18 after shirred section S has been severed therefrom, member 302 (see FIGURE 25) includes a tubing gripper unit 326 comprising an arcuate gripper element 328 having a lining 330 of resilient material, such as sponge rubber. Element 328 is supported on the end of a rod 332 threaded for travel in a bracket 324 pivotally mounted on pin 336 carried by an extension 338 on member 302.

Spring 340 normally urges rod 332 toward mandrel 10 while stop 341 on bracket 334 is operative to engage a portion of member 302, maintaining rod 332 in parallel disposition to member 302 such that when member 302 is positioned in gripping engagement with mandrel 10 element 328 is simultaneously positioned in engagement with mandrel 10 and the leading end of the unshirred tubing C as shown in FIGURE 25.

To effect release of the tubing C from engagement with unit 326 at the shirring zone, there is fixed to plate 42 a cam plate 342 extending beneath mandrel 10 and into the path of travel of a vertical extension pin 343 on bracket 334. Cam plate 342 includes a projecting surface 344 extending parallel to mandrel 10 with a cam face 346 adjacent the start of the shirring zone adapted to engage extension pin 343 as unit 326 moves thereover with transfer member 24. Engagement of extension pin 343 by cam face 346 pivots unit 326 about pin 336 against the action of spring 340, and away from mandrel 10 to thereby release the leading end of tubing C at the shirring zone.

EJECTOR MECHANISM

Ejector mechanism 32 is preferably supported on the far side of mandrel 10 opposite to the transfer mechanism 24 and is supported by bracket 348 fixed to the machine table T (see FIGURE 1). Member 32 includes a casing engaging an ejector member 350 supported transversely at one end on the piston rod 352 of a double-acting air cylinder 354. The free end of member 350 has formed therein an arcuate opening 356 conforming generally to the shape of mandrel 10 (see FIGURE 1). To close opening 356 when ejector 24 is in operative position adjacent mandrel 10 and thereby completely encircle the mandrel, there is provided a latch arm 358 pivotally connected to member 350 adjacent one side of opening 356. Arm 358 is of arcuate configuration and pivotally connected to member 350 adjacent its mid-point. Latch arm 358 is adapted to close opening 356 and thereby complete the encirclment of the mandrel 10.

Normally when ejector 24 is in non-operative position (see FIGURE 1), latch 358 depends from member 350 with section 360 thereof in the path of a mandrel entering opening 356. When member 350 is moved into position adjacent mandrel 10 as described in more detail hereinbelow, the mandrel 10 engages section 360 and the relative movement of mandrel 10 and member 350 pivots arm 358 about its connection to member 350 moving the terminal portion 361 of arm 358 around the mandrel 10 completing the encirclement thereof.

Preferably member 302 of transfer and compression member 24 includes a latch arm for the opening 308 therein which is similar in construction and operation to arm 358 described above. Cylinder 354 is pivotally supported adjacent its mid-point on swivel 362 carried by bracket 348. To assist in supporting member 350 and rod 352 when in fully extended position as shown in FIGURE 1, the end 354 of member 350 remote from mandrel 10 is slidably mounted on a support bar 366 which extends parallel to the line of travel of rod 352 and is, in turn, mounted on spaced transverse plates 368 and 370 carried on cylinder 354.

The rod support bar 366 thus supports rod 352 and member 350 but is also mounted for pivotal movement therewith about swivel 362. To effect movement of cylinder 354 and its associated elements about swivel 362 toward and away from mandrel 10, there is provided a second air cylinder 372 pivotally mounted to swivel support 374 on bracket 348. The external end 376 of the piston rod 378 of cylinder 372 is in turn pivotally fixed to bar 366 between the plates 368 and 370. Thus any extension or retraction of rod 378 pivots cylinder 354 about swivel 362 to move casing engaging and ejector member 350 laterally into and out operative casing engaging position adjacent mandrel 10.

It will be observed from the foregoing description that transfer member 24 and ejector member 32 include a number of elements which are similar in construction and operation.

CASING RECEIVING MEMBER

Turning to FIGURES 1, 3, and 5 and more particularly to FIGURES 22–24, there is illustrated one form of suitable receiving member 380 onto which shirred sections S are delivered by ejector 32. Receiving member 380 includes an elongated delivery tray 382 of generally V-shaped cross-section positioned adjacent rear grip members 34 and 36 and adapted to receive therein sections S stripped from mandrel 10 by ejector 32 at the end of its travel along mandrel 10.

Tray 382 is mounted at one end of transverse support 384 having a cam follower 386 at its other end disposed in a cam tract 388 formed in a cam plate 390 fixed in vertical disposition to table T.

Adjacent its mid-point, support 384 is pivotally secured to a stud pin 392. Pin 392, in turn, is formed with an enlarged head portion 394 fixed to the free end of a piston rod 396 of a suitable air cylinder 398 mounted on table T.

Also included is a reject device operative to segregate defective shirred section S from acceptable shirred sections. This reject device comprises a generally triangular plate 400 having a pair of converging sides 402 and 404. Plate 400 is slidably mounted on cam plate 390 to selectivebly block off portions of track 388 thereby controlling the movement of follower 386 therein. To slide plate 400, it is pivotally fixed to one terminal end 406 of a bell crank 408 rotatably mounted at its crook 410 to plate 390. The other terminal end 412 of crank 408 is pivotally secured by means of a small lost-motion device 414 to the free end of piston rod 416 of air cylinder 418 secured to the underface of table T.

Normally plate 400 occupies the position shown in FIGURE 24. With plate 400 so disposed there is thus defined in plate 390 a restricted inclined cam follower passage 420 one side of which is formed by side 404 of plate 400. When, during the cyclic operation of the machine a suitable shirred section S is delivered onto tray 382 by ejector 32, cylinder 398 is energized retracting its piston rod 396. As piston rod 396 is retracted, support 384 connected thereto is travelled downwardly. In addition, cam follower 386, traveling in inclined cam tract 420 as support 384 is moved by piston rod 396, effects rotation of support 384 about its pivoted connection 392 into the inclined position shown in full lines, FIGURE 24, to deposit the shirred section S on tray 382 into a receiving carton 422. Preferably carton 422 is of paperboard or similar material and has a plurality of equally-spaced perforations 423 therethrough. Perforations 423 (shown schematically in FIGURE 24) are provided in the sides, top, and bottom of carton 422 to facilitate the subsequent heat-curing of sections S described in aforesaid Patent No. 3,123,653.

When a defective section S is delivered to tray 382, however, cylinder 418 is actuated, as described hereinafter, to extend its rod 416, thereby sliding plate 400 against the action of spring 424 into the position shown in FIGURE 22. In this position, there is defined in plate 390 a different inclined cam follower tract 426 one side of which is formed by side 402 of plate 400. Now, when rod 396 is retracted as described immediately above, cam follower 386 is operative to pivot support 384 and tray 382 into the position shown in phantom in FIGURE 24. In this position, the defective sections are delivered into a reject container 428 and thus segregated from those sections S found to be acceptable.

FIGURES 26 and 27 illustrate the preferred embodiment of receiving member. In this embodiment, shirred sections S are delivered by ejector 32 onto a normally horizontally-disposed receiving gate 430 pivotally secured to a support plate 432 suitably secured as by a bracket (not shown) to the top face of table T.

Adjacent the free end of gate 430 there is provided a casing delivery chute 434 open at both ends and comprising a bottom 436 aligned with gate 430, a pair of side members 438 and 440 spaced apart a distance slightly greater than the length of sections S. Shirred sections S have a tendency to elongate or unpleat upon release of the compressive force exerted thereon by member 24. Thus, the lengths of sections S delivered between spaced sides 438 and 440 are confined therebetween to overcome this tendency of the sections to unpleat. Cover 442 of chute 434 is formed preferably in two sections 444 and 446. Section 444 is fixed to the top edges of sides 438 and 440 and is provided with an upwardly inclined position 448 adjacent gate 430 to facilitate entry of casing sections S into chute 434. Section 446, in turn, is pivotally connected to section 444 at the end thereof remote from portion 448. Section 446 thus can be opened to provide access to the sections S for periodically removing them from chute 434. The portion of sidewall 440 adjacent section 446 has provided therein an elongated slot 447 adapted to receive the tines 449 of a fork-like casing pick-up device 451.

In normal operation, when an acceptable casing section S is delivered onto gate 430, air cylinder 450 fixed to support 432 is actuated to extend its piston rod 452 across gate 430. The free end of piston rod 452 is provided with an elongated pusher element 454 adapted to engage section S on gate 430 and move it laterally of its longitudinal axis into chute 434 as shown in FIGURE 27. Retraction of rod 452 clears gate 430 for receipt of the next successive section S from mandrel 10. To ensure proper alignment of the sections S in chute 434, there is provided a suitable block 456 contiguous to the first section S in chute 434. Block 456 offers resistance to movement of the sections S along chute 434 as successive sections are inserted therein by pusher 454, thereby assisting in maintaining side-by-side alignment of the sections S in chute 434 and thus facilitating their removal when desired.

When a number of acceptable shirred sections S are accumulated in chute 434, section 446 is opened and the operator inserts tines 449 of fork member 451 through slot 447 axially into the hollow sections S. Block 456 is removed and tines 449 with shirred sections S thereon are moved through slot 447 past the free end 445 of side 440. When the last tine 449 moves past end 445, releasing fork 451 from side 440, block 456 is replaced and the shirred sections S on fork member 451 are transferred to a receiving carton (not shown)) similar in construction to carton 422, previously described.

Normally, gate 430 is horizontally disposed and aligned with bottom 436 of chute 434 so that sections S may be readily transferred by pusher 454 into chute 434. Gate 430 is pivotally secured to one end of the normally-extended arm 458 of a suitable solenoid 460 fixed to the underface of support 432 and thus normally maintained in horizontal closed position.

However, when a defective shirred section is about to be delivered by ejector 32, a circuit is completed, as explained hereinbelow, to energize solenoid 460 and retract arm 458 thereof. This pivots gate 430 into open position shown in dotted lines, FIGURE 27. The defective sections are deposited through the open gate 430 into reject chute 460 positioned beneath chute 434, thus maintaining effective segregation of defective and acceptable shirred sections S.

DE-TWISTER DEVICE

It has been found that, from time to time, tubing C becomes twisted or rotated about its central axis as it enters the bite of feed rolls 12 and 14 and during rolls 16 and 18, due to the angular relationship of fingers 19. This tubing twist interferes with proper shirring action. To correct this tubing twist, there is provided adjacent the entry of tubing C between feed rolls 12 and 14 as shown in FIGURE 2 a de-twisting device comprising a pair of opposed rollers 462 and 464 (see FIGURE 2) preferaby formed of a plastic material; such as, nylon or one of the tetrafluorethylene resins.

Roller 462 is rotatably supported in vertical disposition by stub shaft 466 mounted in a suitable bracket 468 fixed to plate 42. Roller 464, in turn, is rotatably supported on a shaft 470. Shaft 470 is pivotally mounted as by pivotal connection 472 transversely to a stub shaft 474 fixed to plate 42. It will be understood that connection 472, while permitting rotation of shaft 470 about its connection to shaft 474, is provided with sufficient internal resistance, that the position of shaft 470 can be set relative to shaft 474, and it will remain in position until reset by the machine operator.

In normal operation with tubing C centered on mandrel 10 and no twist therein, shaft 470 is positioned relative to shaft 474 such that rollers 462 and 464 are in coplanar alignment and in rolling frictional contact with diametrically opposed side portions of tubing C passing therebetween. When the machine operator visually observes that tubing C has developed a counter clockwise twist, that is, it has rotated about its central axis in counter clockwise direction as viewed from the right in FIGURE 2, the operator rotates shaft 470 in the direction of arrow O, FIGURE 2 to position roller 464 out of alignment with roller 462.

The tubing C thus is contacted by a skewed roller 464 first before it is contacted by vertical roller 462. This arrangement produces a rotating effect on tubing C to overcome the counter clockwise twist therein.

In like manner, when tubing C develops a clockwise twist therein, as visually observed, shaft 470 is rotated in the direct of arrow P, FIGURE 2, to position roller 464 out of alignment with roller 462 whereby tubing C is contacted first by vertical roller 462 and then by skewed roller 464. This roller arrangement produces a rotating effect on tubing C to overcome the clockwise twist therein.

PNEUMATIC AND ELECTRICAL CONTROL SYSTEM

Figure 30:
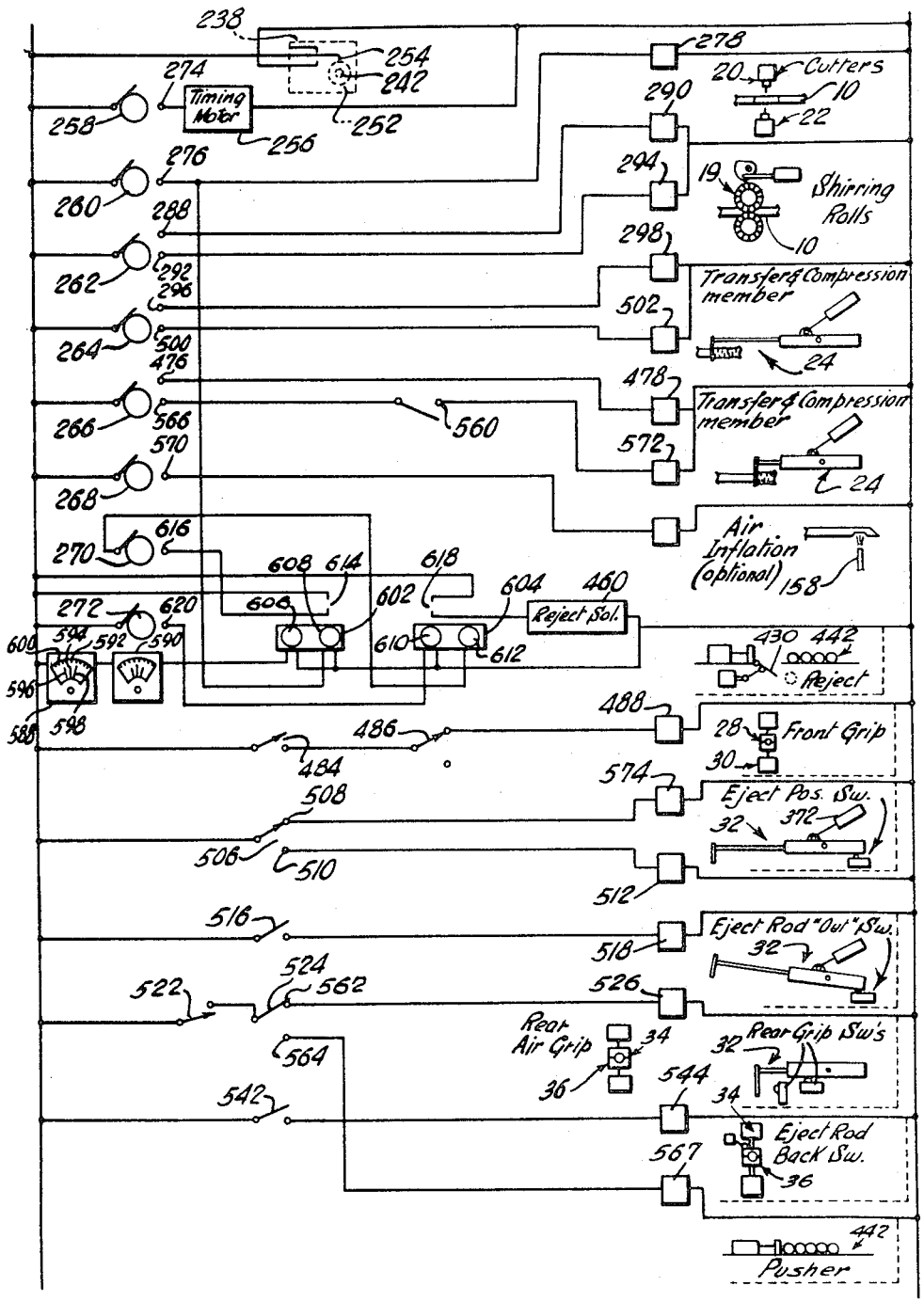
FIGURE 30 is a schematic wiring diagram of a suitable electrical control system for the invention.

FIGURES 29 and 30 disclose a suitable schematic pneumatic and electrical control system for selectively actuating the several machine elements in a pre-determined, time cyclic relationship.

The cyclic operation of the machine is effected by a variable precision speed reducing device 238.

Reducer 238 (see FIGURES 5 and 6) includes an input shaft 240 and an output shaft 242. For a given number of revolutions of shaft 240, shaft 242 makes one complete revolution. Means are provided by adjustment 244 for selectively varying the number of revolutions of shaft 240 to effect one revolution of shaft 242.

To rotate shaft 240, there is provided thereon a sprocket 246 driven by endless chain 248 from a sprocket 250 fixed to shaft 38. Output shaft 242 of reducer 238 includes a cam 252 adapted to momentarily engage and close normally-open switch 254 (see FIGURE 30).

The closing of switch 254 starts the cyclic operation of the machine. Reducer 238 is set such that when the desired length of tubing C has been fed by feed rolls 12 and 14 as determined by the number of revolutions of shaft 240 from shaft 38, cam 252 engages and closes switch 254. The closing of switch 254 completes an electrical circuit which temporarily energizes a synchronous timer motor 256. Timer motor 256 is constructed and arranged to remain energized after switch 254 reopens until its timing cycle has been completed. A timer motor for this purpose is produced by the Eagle Company, Torrington, Conn.

Timer motor 256 is provided with an output shaft on which are mounted eight cams 258, 260, 262, 264, 266, 268, 270, and 272.

Cam 258 is, adapted upon temporary energization of motor 256 by closing of switch 254, to be rotated out of engagement with an associated normally closed switch 274 in the motor hold-in circuit. This keeps motor 256 energized until can 258 completes its revolution on the motor output shaft and engages and opens switch 274 at the end of the timing cycle.

Cam 260 is associated with cutters 20 and 22 and adapted to engage and close an associated open switch 276 which completes a circuit actuating cutters 24 and 26. The completed circuit energizes a solenoid valve 278, which upon actuation, admits air under pressure to air cylinders 280 and 282 mounted on plate 42. The normally-retracted piston rods 284 and 286 of cylinders 280 and 282 are connected to upper and lower cutters 20 and 22 respectively. Energizing solenoid 278 effects extension of rods 284 and 286 to move cutters 20 and 22 into engagement with tubing C to sever the shirred sections S from the remainder thereof (see FIGURE 28A).

Cutters 20 and 22 remain in operative cutting position until the output shaft moves cam 260 out of engagement with switch 276, thereby interrupting the circuit energizing solenoid 278, deactivating valve 278. With valve 278 deactivated, the rods 284 and 286 are retracted to their normal position within cylinders 280 and 282 thereby moving cutters 20 and 22 out of operative cutting position until the next cutting operation.

At the end of the severing operation, cam 262 associated with shirring rolls 16 and 18 engages and closes an associated open switch 288 completing an electrical circuit which effects the movement of rolls 16 and 18 away from mandrel 10. This completed circuit actuates a solenoid valve 290 admitting air under pressure to double-acting air cylinder 100, extending rod 98 thereof to rotate sector 94 about shaft 96 in the direction of the arrow, FIGURE 6. As described hereinabove, rotation of sector 94 in this direction effects movement of shirring rolls 16 and 18 away from mandrel 10 to permit travel of transfer and compressor member 24 therepast.

When the transfer operation has been completed, cam 262 is rotated out of contact with switch 288 and into engagement with a second normally-open switch 292. This interrupts the circuit energizing solenoid valve 290 but completes a circuit actuating a second solenoid valve 294. Valve 294 admits air under pressure to cylinder 100 to retract rod 98, reversing the rotation of sector 94 to return shirring rolls 16 and 18 to operative shirring position adjacent mandrel 10. Preferably, cam 262 remains in engagement with switch 292 to normally maintain valve 294 in actuated condition during the shirring operation thus positively maintaining rolls 16 and 18 in operative shirring operation until the next successive transfer operation.

Substantially, simultaneously with the completion of the cutting operation, cam 264 associated with transfer member 24 is rotated into engagement with a normally-open switch 296, completing a circuit which positions transfer member 24 in operative position adjacent mandrel 10. Completion of this circuit energizes solenoid valve 298, admitting air under pressure to double-acting air cylinder 320 pivotally mounted on a support bracket 300 on the machine table T. Energization of cylinder 320 extends piston rod 324 thereof, pivoting cylinder 306 about swivel 310 and moving casing transfer member 302 into operative mandrel engaging position as shown best in FIGURE 1.

Upon positioning of member 302 in engagement with mandrel 10, cam 266, associated with the transfer member 24, is rotated into engagement with normally-open switch 476 to complete a circuit energizing solenoid valve 478, admitting under pressure to double-acting air cylinder 306 to retract piston rod 304 thereof. Retraction of rod 304 moves member 302 along mandrel 10 in the direction of arrow Z, FIGURE 28C. As member 302 is thus travelled along mandrel 10 and between open rolls 16 and 18, it engages the trailing end of shirred section S and urges section S along mandrel 10 to the compression station where the leading end thereof contacts stop blocks 168 and 170 disposed in the path of travel of section S. Member 302, however, continues to move along mandrel 10 until rod 324 is fully retracted whereupon member 302 is positioned as shown in phantom in FIGURE 1. It will be evident that the continued movement of member 302 relative to section S positioned against blocks 168 and 170 exerts an axial compressive force on section S, and thereby reducing the length of the section. Springs 186 and 188 provide resilient resistance to the tendency of blocks 168 and 170 to move along rods 164 and 166 as member 302 exerts its compressive force on the section S.

Normally, blocks 168 and 170 are urged by the compressive force on section S into the positions shown in dotted lines, FIGURE 10.

It has been found that the application of some temporary yieldable resistance to movement of the leading end of the section being shirred along mandrel 10 facilitates the shirring operation and produces a better shirred section S. The resistance need only be temporary until a sufficient amount of tubing has been shirred to furnish section S with sufficient internal resistance to movement along mandrel 10 to facilitate the shirring operation. For this reason, an air jet 477 (see FIGURE 1) is positioned between shirring rolls 16 and 18 and front grips 28 and 30. The nozzle 479 of jet 477 is adapted to direct air under pressure against mandrel 10 adjacent the bite of rolls 16 and 18. The air emitted from nozzle 479 provides the desired temporary yieldable resistance to movement of the leading end of the section being shirred. Jet 477 is connected in common to the air supply line controlled by valve 478. Thus, upon actuation, valve 478 admits air to cylinder 306 retracting rod 324 to move the shirred and severed section S away from the shirring zone. Simultaneously air is emitted from jet 477 to yieldably impede the movement along mandrel 10 of the next section being shirred.

When piston rod 324 is in its fully retracted position, contact 480 (see FIGURE 1) on member 302 engages the operating arm 482 of a normally-open micro-switch 484 seated on the front of cylinder 306 adjacent the limit of retracted travel of rod 324. This completes a circuit through a second normally-closed micro-switch 486 on plate 368, energizing solenoid valve 488 to admit air under pressure to air cylinders 490 and 492 mounted on an elongated bracket 494 on table T. The normally-retracted piston rods 496 and 498 of cylinders 490 and 492 (see FIGURE 29) are connected to upper and lower front grip members 28 and 30 respectively (see FIGURE 1). Energizing of valve 488 effects extension of rods 496 and 498, moving grips 28 and 30 into gripping engagement with sleeve section 142 of mandrel 10. The employment and positioning of switch 484 insures that member 302 will have moved past the area of operation of grips 28 and 30 before grips 28 and 30 are positioned in operative gripping engagement with mandrel 10.

At the completion of the compressing operation, cam 264 (see FIGURE 30) is rotated out of engagement with switch 296 interrupting the circuit energizing valve 298. Simultaneously, cam 264 engages and closes a second switch 500 to energize another solenoid valve 502 (FIGURES 1 and 29) admitting air under pressure to cylinder 320 to retract piston 324. Retraction of piston 324 thereby pivots cylinder 306 about swivel 310 to move member 302 out of casing engaging position and away from mandrel 10 until the next transfer and compression operation. It will be understood that cam 264 remains in engagement with switch 500 keeping valve 502 energized until the start of the next successive transfer and compression operation to thus positively retain member 24 in non-operative position until said next cyclic operation.

Associated with ejector member 32, there is provided a double-contact, micro-switch 506 adjacent the rear section of cylinder 306 which is adapted to have its operating arm 504 engaged by cylinder 306 when cylinder 306 is in non-operative position. The engagement of arm 504 by cylinder 306 opens the normally-closed contacts 508 (see FIGURE 30) of switch 506 and closes the normally-open contacts 510 thereof to complete a circuit energizing solenoid valve 512 admitting air under pressure to cylinder 372 to extend piston rod 378 thereof.

At the start of movement of cylinder 354 (see FIGURES 1, 29, and 30) as it is pivoted about swivel 362 by actuation of cylinder 372 through valve 574, the rear section of cylinder 354 engages operating arm 514 of a normally-open micro-switch 516, closing switch 516 to establish a circuit energizing solenoid valve 518 to admit air under pressure to cylinder 354 to extend rod 352 thereof to properly position casing ejector member 350 for the start of the ejection operation.

Employment of limit switches 506 and 516 thus ensures that members 24 and 32 can interact without danger of interference.

As previously described, upon engagement of switch 506 by cylinder 306 cylinder 354 is pivoted toward mandrel 10 to move ejector member 350 into engagement with mandrel 10. When cylinder 354 reaches the limit of its pivotal movement as it positions member 350 in engagement with mandrel 10, the front section of cylinder 354 engages the operating arm 520 of a normally-closed micro-switch 522 positioned in its path of travel. This completes a circuit through a second normally-closed switch 524 on plate 368 to de-energize solenoid valve 526. Upon de-energization, the air pressure normally fed cylinders 528 and 530 mounted on an elongated bracket 532 secured to table T is interrupted. The normally-extended piston rods 534 and 536 of normally-actuated cylinders 528 and 530 are connected to upper and lower rear grip members 34 and 36 respectively. De-energizing solenoid valve 526 effects retraction of rods 534 and 536 to move grips 34 and 36 out of gripping engagement with mandrel 10 and likewise move barrier 26, connected thereto, to non-operative position, thereby permitting free movement of section S along mandrel 10 during the ejection operation.

When grip 34 reaches its limit of upward travel out of operative position and away from mandrel 10, the top surface 538 thereof engages the operating arm 540 of a normally-open micro-switch 542 positioned in its path of travel, closing switch 542 to complete a circuit energizing solenoid valve 544 admitting air under pressure to cylinder 354 to retract rod 352 thereof. Retraction of rod 352 travels ejector member 350, in engagement with mandrel 10, therealong into contact with the trailing end of the compressed shirred casing section S. Continued retraction of rod 352 moves member 350 with its engaged section S along mandrel 10 between open rear grips 34 and 36 stripping section S from the end of mandrel 10 axially onto waiting gate member 430 aligned therewith.

When rod 352 reaches its fully-retracted position at the end of the ejection operation just described, contacts 546, 548, and 550 carried by a bracket 352 on the top edge of member 350 engage respectively the operating arms 554, 556, and 558 of switches 524, 486, and 560 carried by plate 368.

Engagement of arm 554 by contact 546 opens normally-closed contacts 562 of switch 524 and closes normally-open contacts 564 thereof. Closing contact 564 completes a circuit energizing solenoid valve 567 to admit air under pressure to cylinder 450 extending its normally-retracted piston rod 452 to transfer newly-ejected section S from gate 430 into delivery chute 434.

Opening of contacts 562 in turn breaks the circuit energizing valve 526, interrupting the flow of air to cylinders 528 and 530, thereby effecting return of their piston rods 534 and 536 respectively to normally-extended position. This returns rear grip members 34 and 36 and their associated elements into operative gripping engagement with mandrel 10.

Engagement of arm 556 by contact 548 opens normally-closed switch 486 interrupting the circuit energizing solenoid valve 488. This de-actuates cylinders 490 and 492 returning their piston rods 496 and 498 to normally-retracted position moving front grip members 28 and 30 out of operative mandrel-gripping position.

Engagement of arm 558 by contact 550 closes normally-open switch 560. Prior to engagement of arm 558 by contact 550, cam 266 of timer 256 is rotated out of engagement with switch 476 and into contact with a second switch 556. Disengagement of contact 476 by cam 266 interrupts the circuit energizing valve 478 and thus the supply of air to jet 477 and to the side of cylinder 306 for retracting rod 304.

With cam 266 now in contact with switch 566 and switch 560 closed by contact 550, a circuit is completed, actuating solenoid valve 568, admitting air under pressure to cylinder 306 to extend rod 304 thereof to await the start of the next transfer and compression operation.

As described hereinabove, when it is desirable in order to maintain proper tubing inflation, to provide auxiliary air pressure, as rear grips 34 and 36 are being moved into open position as previously described, cam 268 is rotated into engagement with an associated switch 570 to complete a circuit energizing a suitable solenoid valve 572 to admit pressurized air from source of supply into line 162 to temporarily direct said air toward inlet port 140 in mandrel 10.

CASING REJECT CONTROL MECHANISM

As described hereinabove, means are provided for segregating defective shirred casing sections S from the acceptable sections S. Defective sections are those sections which include casing having an internal diameter above or below predetermined limits. It has been found that, when the internal diameter tubing C has been allowed to shrink or contract after extrusion and tubing C then expands during drying to return it to its original internal diameter in order to achieve a finished casing of the desired diameter; the resultant product did not have sufficient elasticity to be stuffed and linked.

Likewise, casing sections S which have portions thereof with an internal diameter either larger or smaller than standard present difficulty in stuffing and linking since the lack of uniformity in internal diameter results in stuffed sausage sectons having more or less meat emulsion than desired. Thus quality and weight control standards cannot be maintained by the meat packer.

Accordingly, means are provided for detecting tubing having an internal diameter above or below a pre-selected range and for actuating the segregating means by the detecting means to separate the sections having portions with internal diameters beyond said range from the casing sections having the proper internal diameter.

The detecting means comprises a pair of spaced cooperating rollers 567 and 578 (see FIGURE 2) between which tubing C passes as it leaves rehumidification chamber R and before it passes between the de-twister rollers 462 and 464. Roller 576 is rotatably carried on a shaft 580 fixed to an extension 582 of plate 42. The bottom portion of tubing C is in rolling frictional contact with roller 576 while the upper roller 578 rests on and is in rolling frictional contact with the top portion of tubing C.

Roller 578 is preferably a dancer roller and is rotatably mounted at one end of operating arm 584 of a suitable rotary transducer or potentiometer 586 fixed to extension 582. Arm 584 is pivotally supported in transducer 586 for ready movement upwardly or downwardly in the directions of the arrows.

Normally, arm 584 supports roller 578 in the path of travel of tubing C such that roller 578 is biased by gravity toward and in contact with the top center portion of tubing C. Any variation in the inflated internal diameter of tubing C as it moves between rollers 576 and 578 causes roller 578 to move either upwardly or downwardly depending upon whether the casing diameter is greater or smaller than the desired internal diameter. In turn, this movement of roller 578 pivots arm 584 of potentiometer 586 in the direction of the clockwise arrow, FIGURE 2, for a casing having an internal diameter that is too large or in the direction of the counterclockwise arrow, FIGURE 2, for a casing having an internal diameter that is smaller than desired.

To translate this movement of roller 578 and arm 584 into actuation of the casing rejection means, potentiometer 586 is electrically associated with a suitable electro-mechanical diameter deviation meter device 588, which preferably includes an internal amplifier and an internal relay (not shown).

Meter 588 (see FIGURE 30), in turn, is electrically connected to a suitable time delay unit 590 for controlling the energization of solenoid 460 of the preferred embodiment of casing reject device or solenoid 448 of the first described form of casing reject device.

In operation, the air supply to inflate tubing C is adjusted to produce the desired internal diameter of the finished casing prooucts. For fresh pork sausages, this is preferably about 18 mm.∓5 mm. It has been further found that an air pressure of 1–2 p.s.i.g. is sufficient to properly inflate tubing C during the drying, rehumidifying and shirring operations.

With the air supply properly adjusted by the operator, meter 588 is connected to a suitable source of electrical power which generates a normal signal through the meter 588 and the potentiometer 586. This normal signal is determined by the particular or normal position assumed by roller 578 and arm 584 when the casing is adjusted by the operator to achieve the desired internal casing diameter at the start of machine operations. The meter 588 is then appropriately adjusted so that the datum 592 and the registering needle 594 thereof are aligned for this normal signal. In addition, the operator sets the needles 596 and 598 to positions on the indicated dial 600 corresponding to the upper and lower tolerance limits, as dictated by quality control specifications.

In the automatic operation of the present invention, as roller 578 and arm 584 are moved upwardly and downwardly from their normal positions by variations in the internal inflated casing diameter, the signal is correspondingly varied from the normal signal, as determined by the proper internal casing diameter. When arm 584 is pivoted upwardly in the clockwise direction, FIGURE 2, the signal is varied to indicate that the inflated internal casing diameter is larger than normal. This particular signal variation is amplified and causes needle 594 to move toward upper limit indicator needle 596. If the signal variation is sufficiently large, indicating a casing section having an inflated internal diameter larger than the preset casing diameter upper limit, needle 594 is moved past limit needle 596, thereby actuating the internal relay of meter 588.

When the casing diameter is too small as determined by roller 578 permitting arm 584 to pivot in the counterclockwise direction, FIGURE 2, the above-described process is repeated except that needle 594 moves past lower limit indicator needle 598. This also actuates the internal relay of meter 588.

The internal relay of meter 588 actuated by an inflated tubing diameter that is above or below the pre-selected range, in turn, energizes time delay unit 590. Time delay unit 590 is so constructed and arranged that it can be preset by the machine operator requiring it to be continuously energized by meter device 588 for a selected length of time before unit 590 is actuated. This insures that minor or temporary diameter fluctuations which do not adversely affect the use of the casing will not result in such casing section being rejected. It has been found that, for a twenty-five foot casing section, preferably a continuous length of from two to three feet of casing having a greater or smaller diameter than desired should be detected before such section is rejected. Accordingly, time delay unit 590 is usually set at three seconds; that is, unit 590 must be continuously energized by meter 588 for three seconds before unit 590 is actuated. The three seconds corresponds to from two to three feet of tubing C having a diameter beyond the pre-selected range being sensed by roller 578.

Associated with the casing rejection mechanism are a pair of relay units 602 and 604 each including a pair of internal relays, 606, 608 and 610, 612 respectively. Internal relay 606 is electrically associated with time delay unit 590. When time delay unit 590 is actuated as described hereinabove, it trips relay 606 closing contacts 614 thereof.

However, from the description of the machine operation, it will be understood that a shirred, severed length is compressed and ejected from mandrel 10 as the next successive length is being shirred. Likewise, it will be evident that the diameter of the tubing forming part of the next successive length is what is sensed by roller 578. Thus, when relay 590 is actuated as described above, provision must be made for rejection of the next successive section then being shirred and not the section then being compressed and ejected.

To provide for this, cam 270 is rotated out of engagement with its associated switch 616 practically simultaneously with start of the machine cycle and energization of timer 256. Cam 270 remains out of contact with switch 616 until just prior to the end of the machine cycle and after the stripping of sections S from mandrel 10 and the delivery thereof into chute 434.

When relay 606 is energized closing contacts 614 and cam 270 engages switch 616, a circuit is completed through contacts 614 and switch 616, energizing relay 612. Energization of relay 612 closes contacts 618 thereof establishing a circuit to actuate solenoid 448 or 460 of the casing reject device. Contacts 618 of relay 612 remain closed until reset as described hereinbelow.

Figure 31:
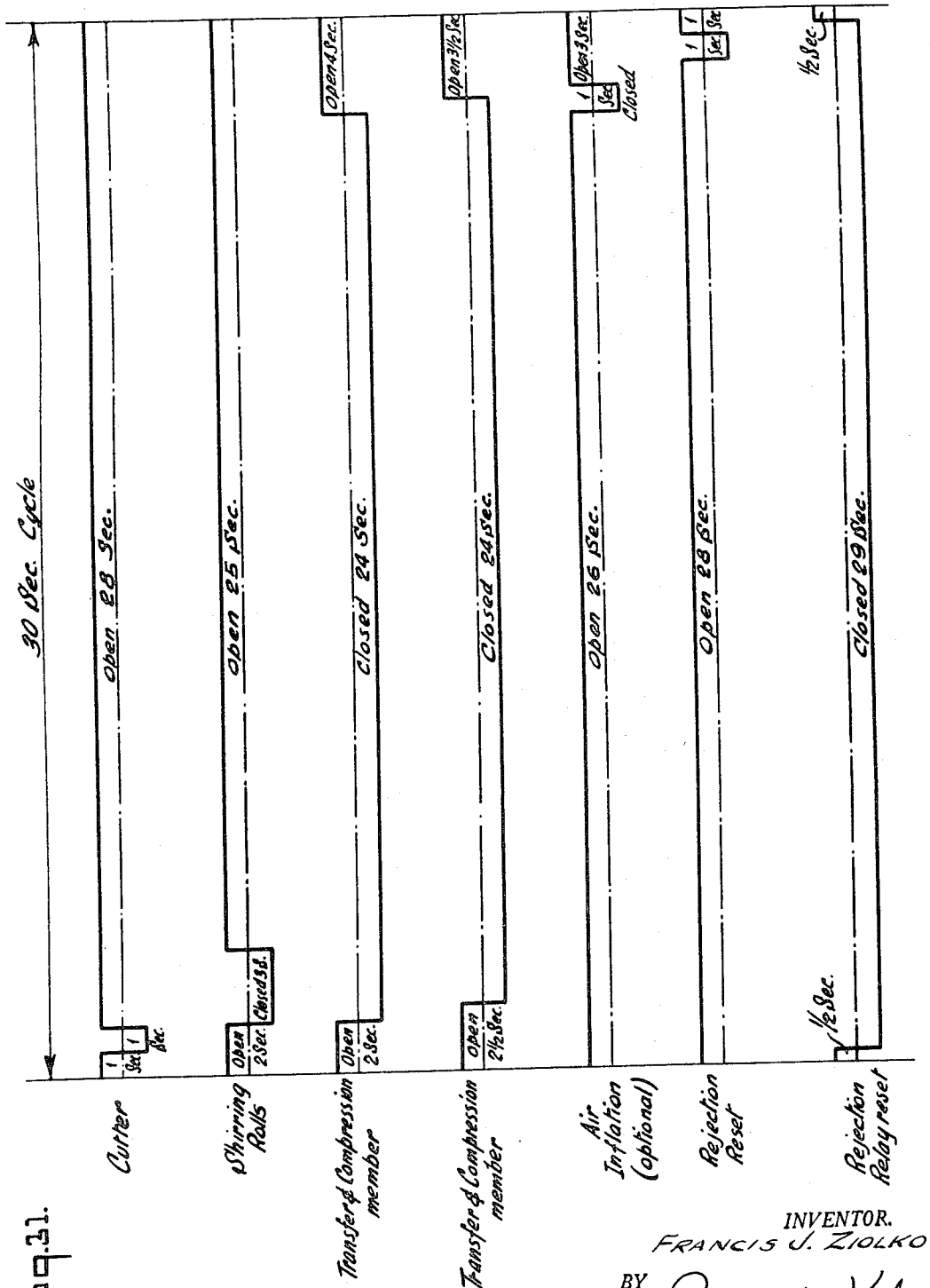
FIGURE 31 is a timing diagram of a typical cycle of operation of the invention.

Relays 608 and 610 are employed to reset contacts 614 and 618 of their associated units 602 at 604. Relay 608 is energized by the establishment of a circuit through cam 260 and switch 276 at the start of the machine cycle. Actuation of relay 608 opens contact 614 resetting relay unit 602 for the next impulse from time delay unit 590. However, it will be noted from FIGURE 31 that relay 608 cannot reset a tripped relay 602 during the machine cycle until a circuit has been completed through contacts 614 of tripped relay 602 and switch 618 to energize relay 612.

Likewise, cam 272 is provided on the timer motor shaft to momentarily engage an associated switch 620, preferably near the end of the machine cycle but before cam 270 engages switch 618. (See FIGURE 31.) This completes a circuit energizing relay 610, opening contacts 618, resetting relay unit 604 for the next impulse from relay 602.

Thus, the casing reject control means are operative to ensure that the correct casing section is rejected and segregated.

OPERATIONAL SEQUENCE

Turning now to FIGURES 28A–28I, there is schematically illustrated the timed operating relationship of the various elements of the invention.

Speed reducer 238 is preferably set so that output shaft 242 thereof makes one complete revolution for the number of revolutions of input shaft 240 corresponding to twenty-five feet of tubing C fed by rollers 12 and 14. In normal operation, machine usually requires thirty seconds to feed the desired twenty-five feet of tubing C.

Motor 70 is actuated by the operator to continuously rotate rolls 12, 14, 16, and 18. Simultaneously, the air supply compressor (not shown) is actuated to properly inflate tubing C as it travels toward feed rolls 12 and 14.

When twenty-five feet of tubular body C have been fed by feed rolls 12 and 14, cam 252 and 238 momentarily engages and closes normally-open switch 294 starting the cyclic operation of the several machine elements.

Timer motor 256 actuated by the circuit completed by cam 252 starts rotating its output shaft with cams 258–272 mounted thereon. Preferably, timer motor 256 has a thirty-second cycle (see FIGURE 31). Upon momentary energization of motor 256, cam 258 engages its associated switch 274 and remains in engagement therewith for the full machine cycle thereby keeping motor 256 energized.

Cam 260 is adapted one second after the start of the machine cycle, to engage its switch 276 and remain in engagement therewith for one second to effect the severing of the shirred S from the leading end of tubular body C (see FIGURE 28A).

Simultaneously, with the completion of the cutting operation, cam 264 engages switch 296 to actuate valve 298 and cylinder 320 to position casing engaging member 302 in operative disposition in contact with mandrel 10 (FIGURE 28B).

With cylinder 306 pivoted out of engagement with switch 506 as member 302 is moved into operative position, valve 512 is energized to move ejector cylinder 354 away from mandrel 10. As ejector cylinder 354 is pivoted completely away from mandrel 10, it engages switch 516 to energize valve 518 to extend rod 352 disposition member 350 adjacent front grips 28 and 30 as shown in phantom in FIGURE 28B.

With member 302 in operative mandrel engaging position, cam 266 engages its associated switch 476 to energize valve 478, actuating cylinder 306 to retract rod 304 thereof, moving section S against stop blocks 168 and 170 of yieldable barrier 26. Likewise, actuation of valve 478 admits air to jet 477 to facilitate shirring of the next successive section S.

To permit free movement of member 302 past shirring rolls 16 and 18, simultaneously with the engagement of switch 476 by cam 266, cam 262 engages switch 288 energizing valve 290 and cylinder 100, extending rod 98 thereof to open rolls 16 and 18 (see FIGURE 28C).

Shirring rolls 16 and 18 remain open for preferably three seconds after which cam 262 is rotated out of engagement with switch 288 and into engagement with switch 292 to effect return of shirring rolls 16 and 18 to operative shirring position to start shirring the next successive section S from the leading end of tubing C delivered thereto by tubing gripper unit 326 on member 24.

When member 302 reaches its limit of travel toward cylinder 306, switch 484 is closed to actuate valve 488 moving front gripper members 28 and 30 into gripping engagement with mandrel 10.

Member 302 remains in engagement with section S exerting a compressive force thereon against yieldable barrier 26. Preferably this force is exerted for approximately twenty-four seconds. At the completion of this compression period, cam 264 is rotated out of engagement with switch 296 and into contact with switch 500, deenergizing valve 298 and energizing valve 502 to rotate cylinder 306 away from mandrel 10 and thus effecting disengagement of section S and member 302 (FIGURE 28D).

Shortly after cam 264 is rotated into engagement with switch 500, cam 266 is rotated out of engagement with switch 476 and into engagement with switch 566. This effects deactuation of valve 478. However, the circuit to valve 568 remains open since it includes normally-open switch 560. Thus, rod 304 remains in retracted position as shown in FIGURES 28D and E.

As cylinder 306 is pivoted away from mandrel 10 at the end of the compression operation, it engages and closes switch 506, energizing valve 574 to pivot cylinder 354 toward mandrel 10, moving ejector member 350 into contact with mandrel 10 as shown in FIGURE 28D.

When cylinder 354 has been fully pivoted toward mandrel 10, it engages and opens switch 522 interrupting a circuit normally energizing valve 526, thereby opening rear grip members 34 and 36 (see FIGURE 28E).

Simultaneously with the movement of cylinder 306 away from mandrel 10, cam 268 engages and closes switch 570 to energize valve 572 to admit air under pressure into the auxiliary air line if such auxiliary air pressure is desired. It will be understood that valve 572 is actuated substantially simultaneously as switch 522 is energized by cylinder 354 to open rear grip member 34 and 36. Cam 268 remains in contact with switch 570 only as long as rear grip 34 and 36 are in open position. This is normally for about one second during the typical thirty-second machine cycle.

As grip member 34 reaches its fully open position, it engages and closes switch 542, energizing valve 544 to retract rod 352. This accomplishes the removal of section S from mandrel 10 into the receiving device (see FIGURES 28E, 28F).

When rod 352 reaches its fully retracted position at the end of the ejection operation, switches 486, 524, and 560 are suitably actuated to respectively: deenergize valve 488, returning front grip members 28 and 30 to open non-operative gripping position; energize valve 567 to push section S into chute 434 while simultaneously deenergizing valve 526 to return rear grips 34 and 36 into mandrel gripping position; energize valve 568 to extend rod 304 to await the next cyclic operation of the machine (see FIGURES 28G and 28H).

The machine maintains the cyclic operation described above travelling a shirred section S along mandrel 10 through a compression station and ejection station, while continuously shirring the leading end of tubular body C and severing it into shirred sections twenty-five feet in length.

It will be understood that the timing cycle described above is by way of example and that other time relations of the machine mechanism, if desired, can be readily obtained by adapting the cams to increase or decrease, as desired, the time that they are in engagement with their associated switches. In addition, the inter-relation of the machine mechanisms can be readily varied by varying the orientation of the cams on the output shaft of the timer motor and by suitably relocating the several microswitches.

FIGURE 32 illustrates a modified form of the invention with plate 42 rotated ninety degrees and the feed rolls 12 and 14 and shirring rolls 16 and 18 rotatable about vertical axes rather than the horizontal axes shown in FIGURE 1 with the other machine elements similarly re-oriented. The manner of mounting the mechanisms of the present invention as shown in FIGURE 32 permits the "ganging" or the placing in adjacent side-by-side relationship of two shirring mechanisms: such side-by-side arrangement lends itself more ideally to production line operations and simplifies the task of the operator who can visually inspect and maintain a greater number of product lines and shirring machines. In addition, this arrangement saves valuable plant floor space and allows utilization of a single element for both machines; such as, a common support plate.

The arrangement of FIGURE 32 is particularly adapted for the continuous shirring of casing sections from a plurality of casing production lines.

Thus, there is disclosed a simple, efficient mechanism for continuously and automatically producing from a continuous inflated collagen tube, shirred compressed and lengths of shirred collagen sections of substantially uniform diameter ready for subsequent stuffing, linking, and cooking as sausage products.

While the invention has been described in detail according to the preferred manner of carrying out the method and the devices embodying the invention, it will be obvious to those skilled in the art, after understanding the invention, that changes and modifications may be made therein without departing from the spirit or scope of the invention, and it is intended in the appended claims to cover such changes and modifications.

What is claimed is:

1. The method for preparing an extruded continuous collagen tube having a predetermined uniform diameter for shirring, stuffing, and cooking in the form of sausage products comprising dehydrating said extruded collagen tube, inflating said collagen tube during the dehydrating thereof to maintain the internal diameter of the collagen tube substantially constant whereby deleterious stretching or shrinking is avoided, rehumidifying said dried inflated collagen tube, shirring said collagen tube, continuously monitoring the diameter of said inflated tube prior to shirring, severing said shirred tube into discrete lengths, subjecting said discrete shirred lengths to an axial compressive force, delivering said discrete lengths to a discharge station, and segregating said lengths at said discharge station in response to variations in the inflated diameter of sections thereof from predetermined limits;

whereby those lengths that will not withstand the stresses of stuffing and linking due to a non-uniform inflated diameter are separated from those lengths having a uniform inflated diameter, said inflated diameter being within predetermined limits.

2. The method for preparing an extruded continuous collagen tube having a predetermined uniform diameter for shirring, stuffing, and cooking in the form of sausage products comprising drying said extruded collagen tube by heated air currents, inflating said collagen tube during the drying thereof to maintain the internal diameter of the collagen tube substantially constant whereby deleterious stretching or shrinking is avoided, rehumidifying said dried inflated collagen tube, shirring said collagen tube, continuously monitoring the diameter of said inflated tube prior to shirring, detecting variations in the inflated diameter of said tube beyond predetermined limits, severing said shirred tube into discrete lengths, subjecting said discrete shirred lengths to an axial compressive force, delivering said discrete lengths to a discharge station and separating said lengths at said discharge station in response to detected variations in the inflated diameter of sections thereof from said predetermined limits;

whereby those lengths that will not withstand the stresses of stuffing and linking due to a non-uniform inflated diameter are separated from those lengths having a uniform inflated diameter, said inflated diameter being within predetermined limits.

3. The method as defined in claim 2, including the step of tensioning the portion of said tube about to be shirred.

References Cited

UNITED STATES PATENTS 3,209,398   10/1965   Ziolko _____ 99—176 X

HYMAN LORD, *Primary Examiner.*